United States Patent
Schuster et al.

(10) Patent No.: US 10,229,438 B2
(45) Date of Patent: Mar. 12, 2019

(54) SYSTEM AND METHOD FOR INTEGRATED, AUTOMATED INVENTORY MANAGEMENT AND ADVERTISEMENT DELIVERY

(75) Inventors: Bobbi Denise Schuster, San Antonio, TX (US); Matthew Ferry, Lake Forest, CA (US); John Fulbright, Ogallala, NE (US); David C. Jellison, Jr., Ogallala, NE (US); Kohinoor Basu, Aliso Viejo, CA (US); Steven M. Gable, Naperville, IL (US)

(73) Assignee: IHEARTMEDIA MANAGEMENT SERVICES, INC., San Antonio, TX (US)

(*) Notice: Subject to any disclaimer, the term of this patent is extended or adjusted under 35 U.S.C. 154(b) by 1149 days.

(21) Appl. No.: 12/613,264

(22) Filed: Nov. 5, 2009

(65) Prior Publication Data

US 2010/0114715 A1    May 6, 2010

Related U.S. Application Data

(60) Provisional application No. 61/193,218, filed on Nov. 6, 2008.

(51) Int. Cl.
*G06Q 30/02* (2012.01)
(52) U.S. Cl.
CPC ......... *G06Q 30/0273* (2013.01); *G06Q 30/02* (2013.01); *G06Q 30/0246* (2013.01)
(58) Field of Classification Search
USPC ....................................................... 705/14
See application file for complete search history.

(56) References Cited

U.S. PATENT DOCUMENTS

| | | | |
|---|---|---|---|
| 6,698,020 B1* | 2/2004 | Zigmond et al. | 725/34 |
| 2002/0032771 A1* | 3/2002 | Gledje | 709/224 |
| 2002/0171691 A1* | 11/2002 | Currans et al. | 345/864 |
| 2004/0205829 A1* | 10/2004 | Hane, III | 725/135 |
| 2005/0240475 A1* | 10/2005 | Margiloff et al. | 705/14 |
| 2007/0255622 A1* | 11/2007 | Swix et al. | 705/14 |
| 2007/0271134 A1 | 11/2007 | Ferry et al. | 705/14 |
| 2008/0040739 A1* | 2/2008 | Ketchum et al. | 725/32 |
| 2008/0052150 A1* | 2/2008 | Grouf et al. | 705/14 |
| 2008/0250446 A1* | 10/2008 | Zigmond et al. | 725/32 |
| 2009/0175591 A1* | 7/2009 | Gondhalekar et al. | 386/83 |
| 2009/0302108 A1* | 12/2009 | Patrick et al. | 235/385 |
| 2011/0029373 A1* | 2/2011 | Steelberg et al. | 705/14.41 |

* cited by examiner

*Primary Examiner* — Sam Refai
(74) *Attorney, Agent, or Firm* — Garlick & Markison; Edward J. Marshall; Randy W. Lacasse

(57) ABSTRACT

A management and delivery method and system for a distributed marketing network. Access to one or more network service gateways associated with a distributed marketing network can be authorized, if particular criteria are satisfied. A business transaction may be coordinated with the distributed marketing network through network service gateways in a near real time fashion and without manual intervention, in response to authorizing the access to the network service gateways. The network service gateways may include a partner interface, a centralized hub that communicates with the partner interfaces, and/or a local market integrated service layer that communicates with the centralized hub and the partner interface. The distributed marketing network may be, for example, a network of radio stations.

20 Claims, 27 Drawing Sheets

```
<AvailClaimMsg xmlns:xsi="http://www.w3.org/2001/XMLSchema-instance" xmlns:xsd="http://
www.w3.org/2001/XMLSchema" PartnerID="1" EnterpriseStationID="498" LogDate="2008-01-03">
    <AvailClaims>
        <AvailClaim BreakID="52262832" AvailClaimInstruction="true" />
        <AvailClaim BreakID="52262869" AvailClaimInstruction="true" />
        <AvailClaim BreakID="52262889" AvailClaimInstruction="true" />
        <AvailClaim BreakID="52262852" AvailClaimInstruction="false" />
        <AvailClaim BreakID="52262910" AvailClaimInstruction="false" />
    </AvailClaims>
</AvailCalimMsg>
```

Verification

File  Actions  Tools  Help

🖨 □ ✂ | 🔍 Search | ✓ ▣ | 💻 Auto Fill  ↶ Undo Auto Fill | 📋 Make Good  ↶ Undo Make Good

Selection Criteria

Market: Los Angeles  ▼   Date From: 10/17/2008 ▼   ☑ Exception   ☑ Sent to Pool
Station: KOST-FM ▼     Date To:   10/17/2008 ▼   ☑ Verified    ☑ Non-Verified

Actions

Pool

Verify

Exceptions

Drag a column header here to group by that column

| BI_ID | Advertiser | Status | A.. | Sched... | Sched... | Order No. | Adv... | Cat No. | Spot ID | Spot ID | Length |
|---|---|---|---|---|---|---|---|---|---|---|---|
| 26195224 | OFF BROAD... | Verified | | 10/17... | 16:56:00 | 135803/8 | 687 | 943 | 280812 | OFF BROAD... | 60 |
| 26712444 | BEVERAGE... | Verified | | 10/17... | 16:54:30 | 133882/5 | 1485 | 521 | 277451 | BEVERAGE... | 30 |
| 25876232 | SO CAL TOY... | Verified | | 10/17... | 16:54:30 | 134015/8 | 955 | 947 | 280829 | SO CAL TOY... | 30 |
| 25640015 | MC DONALDS | Verified | | 10/17... | 16:54:30 | 133483/8 | 778 | 1028 | 281358 | MC DONALDS | 30 |
| 25905919 | MBC TV NET... | Verified | | 10/17... | 16:50:30 | 134850/3 | 619 | 1154 | 282054 | MBC TV NET... | 60 |
| 25975055 | PARTY CITY | Verified | | 10/17... | 16:50:30 | 135186/4 | 3308 | 1084 | 281717 | PARTY CITY | 60 |
| 26202947 | LOS ANGEL... | Verified | | 10/17... | 16:50:30 | 136099/3 | 7805 | 1153 | 282053 | LOS ANGEL... | 60 |
| 22296799 | MERCEDES... | Verified | | 10/17... | 16:50:00 | 120727/6 | 1170 | 1057 | 281552 | MERCEDES... | 30 |
| 26068094 | MACYS WEST | Verified | | 10/17... | 16:50:30 | 134507/5 | 612 | 1068 | 281603 | MACYS WEST | 5 |
| 25902710 | LUXURY OP... | Verified | | 10/17... | 16:47:00 | 134254/1 | 7573 | 1006 | 281161 | LUXURY OP... | 5 |
| 25866828 | MACYS WEST | Verified | | 10/17... | 16:27:00 | 134484/1 | 612 | 1480 | 215815 | MACYS WEST | 60 |
| 26067356 | LIFETIME T... | Verified | | 10/17... | 16:26:00 | 135118/6 | 675 | 1106 | 281820 | LIFETIME T... | 60 |
| 25692049 | KEYES AUT... | Verified | | 10/17... | 16:25:00 | 133757/2 | 1165 | 960 | 280885 | KEYES AUT... | 60 |
| 26195802 | ATT | Verified | | 10/17... | 16:21:00 | 136056/3 | 6 | 1118 | 281872 | ATT | 60 |
| 26088109 | MACYS WEST | Verified | | 10/17... | 16:21:00 | 134484/3 | 612 | 1120 | 281916 | MACYS WEST | 60 |
| 25319234 | ROMANOS... | Verified | | 10/17... | 16:21:00 | 131525/9 | 5982 | 442 | 276945 | ROMANOS... | 60 |
| 25896695 | USA KETW... | Verified | | 10/17... | 16:21:00 | 134766/6 | 1115 | 1116 | 281850 | USA KETW... | 60 |
| 25971630 | LOWES | Verified | | 10/17... | 15:56:00 | 134541/8 | 717 | 1169 | 282133 | LOWES | 60 |
| 25063215 | MERCEDES... | Verified | | 10/17... | 15:54:30 | 117567/10 | 4477 | 74 | 274363 | MERCEDES... | 30 |
| 26037882 | PARAMOUN... | Verified | | 10/17... | 15:54:30 | 135668/3 | 729 | 1024 | 281219 | PARAMOUN... | 30 |
| 26088082 | MACYS WEST | Verified | | 10/17... | 15:54:30 | 136601/5 | 612 | 1068 | 281603 | MACYS WEST | 30 |
| 25857015 | VONS | Verified | | 10/17... | 15:50:30 | 128771/13 | 1075 | 1048 | 281465 | VONS | 60 |
| 26200555 | RO ON PRO... | Verified | | 10/17... | 15:50:30 | 136082/8 | 7689 | 1125 | 281977 | RO ON PRO... | 60 |
| 25552184 | PULIE HOM... | Verified | | 10/17... | 15:50:30 | 133056/ | 3945 | 990 | 280968 | PULIE HOM... | 60 |
| 25905918 | NBC TV NET... | Verified | | 10/17...] | 15:50:30 | 134850/3 | 619 | 1154 | 282054 | NBC TV NET... | 60 |
| 22297155 | MERCEDES... | Verified | | 10/17... | 15:50:00 | 120727/11 | 1170 | 907 | 280508 | MERCEDES... | 30 |
| 25451922 | MITSUBISHI | Verified | | 10/17... | 15:47:00 | 130043/8 | 891 | 81 | 263443 | MITSUBISHI | 5 |
| 25967774 | KAISER PER... | Verified | | 10/17... | 15:27:00 | 135182/1 | 576 | 1382 | 278936 | KAISER PER... | 5 |
| 25692052 | KEYS AUT... | Verified | | 10/17... | 15:23:00 | 133757/2 | 1165 | 1765 | 273557 | KEYS AUT... | 60 |
| 26035751 | HUD | Verified | | 10/17... | 15:23:00 | 135644/4 | 6971 | 571 | 278067 | HUD | 60 |

*FIG. 2E*

| Spot End | Bind To | Actual D... | Actual Ti... | Rate | Order En... | AE | Linked S... | O.C... | Inv No. | MG | MG Reason | Ver. Reason | |
|---|---|---|---|---|---|---|---|---|---|---|---|---|---|
| 10/26/2... | 14:00:00 2... | 10/17/2... | 16:56:10 | $1.10... | 10/19/2... | BUSHEY... | 0 | 🔗 | 0 | ☐ | | | ☐ |
| 10/19/2... | 08:00:00 2... | 10/17/2... | 16:55:40 | $145.00 | 10/31/2... | CCRS SA... | 0 | 📄 | 0 | ☑ | Moved with Ap... | | ☐ |
| 11/02/2... | 09:00:00 1... | 10/17/2... | 16:55:10 | $195.00 | 11/02/2... | RICHAR... | 0 | 🔗 | 0 | ☐ | | | ☐ |
| 10/26/2... | 09:00:00 1... | 10/17/2... | 16:54:40 | $195.00 | 12/21/2... | RICHAR... | 0 | 🔗 | 0 | ☐ | | | ☐ |
| 10/17/2... | 15:00:00 1... | 10/17/2... | 16:53:40 | $1.10... | 10/17/2... | CCRS NE... | 0 | 🔗 | 0 | ☐ | | | ☐ |
| 10/31/2... | 15:00:00 1... | 10/17/2... | 16:52:41 | $1.05... | 10/31/2... | CCRS NE... | 0 | 📄 | 0 | ☐ | | | ☐ |
| 11/04/2... | 15:00:00 2... | 10/17/2... | 16:51:42 | $1.35... | 11/03/2... | CCRS PH... | 0 | 📄 | 0 | ☐ | | | ☐ |
| 10/31/2... | 07:00:00 2... | 10/17/2... | 16:50:42 | $350.00 | 12/21/2... | ROACH... | 0 | 📄 | 0 | ☑ | Moved with Ap... | | ☐ |
| 10/17/2... | 15:00:00 1... | 10/17/2... | 16:50:12 | $600.00 | 10/18/2... | ROSSI, T... | 0 | 🔗 | 0 | ☐ | | | ☐ |
| 10/17/2... | 06:00:00 2... | 10/17/2... | 16:50:01 | $100.00 | 10/17/2... | YERBY,... | 0 | 📄 | 0 | ☐ | | | ☐ |
| 10/24/2... | 05:00:00 2... | 10/17/2... | 16:29:49 | $0.00 | 10/24/2... | ROSSI, T... | 0 | 🔗 | 0 | ☐ | | | ☐ |
| 10/17/2... | 15:00:00 1... | 10/17/2... | 16:29:49 | $975.00 | 10/25/2... | RILEY, J... | 0 | 🔗 | 0 | ☐ | | | ☐ |
| 10/25/2... | 15:00:00 1... | 10/17/2... | 16:27:50 | $550.00 | 10/26/2... | BLACK, D... | 0 | 🔗 | 0 | ☐ | | | ☐ |
| 11/02/2... | 14:00:00 1... | 10/17/2... | 16:25:50 | $900.00 | 12/14/2... | ROSSI, T... | 0 | 🔗 | 0 | ☐ | | | ☐ |
| 10/17/2... | 15:00:00 1... | 10/17/2... | 16:25:51 | $950.00 | 10/18/2... | ROSSI, T... | 0 | 🔗 | 0 | ☐ | | | ☐ |
| 11/23/2... | 15:00:00 1... | 10/17/2... | 16:24:52 | $1.00... | 11/23/2... | RICHAR... | 0 | 🔗 | 0 | ☐ | | | ☐ |
| 10/17/2... | 15:00:00 1... | 10/17/2... | 16:23:52 | $1.15... | 10/17/2... | CCRS LO | 0 | 📄 | 0 | ☐ | | | ☐ |
| 10/26/2... | 15:00:00 1... | 10/17/2... | 15:56:14 | $1.00... | 12/13/2... | RICHAR... | 0 | 📄 | 0 | ☐ | | | ☐ |
| 10/26/2... | 05:00:00 2... | 10/17/2... | 15:55:45 | $650.00 | 01/02/2... | ROACH,... | 0 | 🔗 | 0 | ☐ | | | ☐ |
| 10/19/2... | 15:00:00 1... | 10/17/2... | 15:55:15 | $750.00 | 10/19/2... | CCRS LO... | 0 | 📄 | 0 | ☐ | | | ☐ |
| 10/17/2... | 15:00:00 1... | 10/17/2... | 15:54:45 | $600.00 | 10/18/2... | ROSSI, T... | 0 | 🔗 | 0 | ☐ | | | ☐ |
| 10/20/2... | 15:00:00 1... | 10/17/2... | 15:53:45 | $1.00...1 | 1/03/2333 | ANDERS... | 0 | 🔗 | 0 | ☐ | | | ☐ |
| 10/26/2... | 14:00:00 1... | 10/17/2... | 15:52:45 | $1.00... | 11/03/2... | BAKER N... | 0 | 📄 | 0 | ☐ | | | ☐ |
| 10/18/2... | 15:00:00 1... | 10/17/2... | 15:51:46 | $800.00 | 10/18 | CCRS AT... | 0 | 📄 | 0 | ☐ | | | ☐ |
| 10/17/2... | 15:00:00 1... | 10/17/2... | 15:50:46 | $1.10... | | CCRS NE... | 0 | 🔗 | 0 | ☐ | | | ☐ |
| 10/31/2... | 15:00:00 1... | 10/17/2... | 15:50:15 | $660.00 | | ROACH,... | 0 | 📄 | 0 | ☐ | | | ☐ |
| 10/26/2... | 06:00:00 1... | 10/17/2... | 15:50:05 | $0.00 | | ANDERS... | 0 | 📄 | 0 | ☐ | | | ☐ |
| 12/31/2... | 08:00:00 2... | 10/17/2... | 15:28:35 | $0.00 | | ROACH,... | 0 | 📄 | 0 | ☐ | | | ☐ |
| 1026/2... | 15:00:00 1... | 10/17/2... | 15:27:35 | $550.00 | | BLACK, D... | 0 | 🔗 | 0 | ☐ | | | ☐ |
| 12/31/2... | 10:00:00 1... | 10/17/2... | 15:26:35 | $1.12... | | ROSSI, T... | 0 | 📄 | 0 | ☐ | | | ☐ |

Verified Spots: 252 $145,229.00
Non-Verified Spots: 0 $0.00
Exception Spots: 0 $0.00
Sent to Pool: 0 $0.00
$145,229.00

FIG. 2E
*(Continued)*

SYSTEM AND METHOD FOR INTEGRATED, AUTOMATED INVENTORY MANAGEMENT AND ADVERTISEMENT DELIVERY

CROSS-REFERENCE TO PROVISIONAL PATENT APPLICATION

This patent application claims priority under 35 U.S.C. § 119(e) to U.S. Provisional Patent Application Ser. No. 61/193,218, entitled "System and Method for Integrated, Automated Inventory Management and Advertisement Delivery," which was filed on Nov. 6, 2008 with the U.S. Patent & Trademark Office. U.S. Provisional Patent Application Ser. No. 61/193,218 is herein incorporated by reference in its entirety.

TECHNICAL FIELD

Embodiments are generally related to radio stations and the delivery of data to a network of radio stations. Embodiments are additionally related to the transmission and delivery of inventory management data. Embodiments are further related to the delivery of advertisement data.

BACKGROUND OF THE INVENTION

Prior to the system and method described herein, radio station systems for delivering inventory were disconnected and primarily locally operated. The few systems that were connected either locally, or in some cases regionally, offered little in the way of automation, extensibility, and near time placement of advertising orders across multiple regions.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for the delivery of advertising data to a distributed marketing network such as a network of radio stations.

It is another aspect of the disclosed embodiments to provide for an improved method and system for the transmission, coordination, and delivery of advertising inventory management data to a distributed marketing network.

It is a further aspect of the disclosed embodiments to provide for a method and system for interconnecting and integrating radio station terrestrial and streaming inventory management and audio delivery systems to allow extensions to "partners" to place advertisements in a near real time fashion and without manual intervention.

It is an additional aspect of the disclosed embodiments to provide a method and system that segments portions of local traffic and billing systems utilized by external partners.

It is also an aspect of the disclosed embodiments to provide for an automatic avails (e.g., advertising slots) claiming method and system that automatically releases unclaimed avails back to local markets for local advertising via a distributed marketing network.

It is yet a further aspect of the disclosed embodiments to provide a method and system that generates a push now play continuous, live information stream for communicating advertisement playing status from local markets through an entire enterprise system and up to the partners so that partners and others can be immediately made aware of whether placed advertisements have played or aired through a distributed marketing network.

The aforementioned aspects and other objectives and advantages can now be achieved as described herein. A management and delivery method and system for a distributed marketing network are disclosed. Access to one or more network service gateways associated with a distributed marketing network can be authorized, if particular criteria are satisfied. A business transaction may be coordinated with the distributed marketing network through network service gateways in a near real time fashion and without manual intervention, in response to authorizing the access to the network service gateways. The network service gateways may include a partner interface, a centralized hub that communicates with the partner interfaces and/or a local market integrated service layer that communicates with the centralized hub and the partner interface. The distributed marketing network may be, for example, a network of radio stations.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 2C illustrates an excerpt of an exemplary uploaded log;

FIG. 2E illustrates a screen-shot illustrating an exemplary verification report;

DETAILED DESCRIPTION

Figure 1:
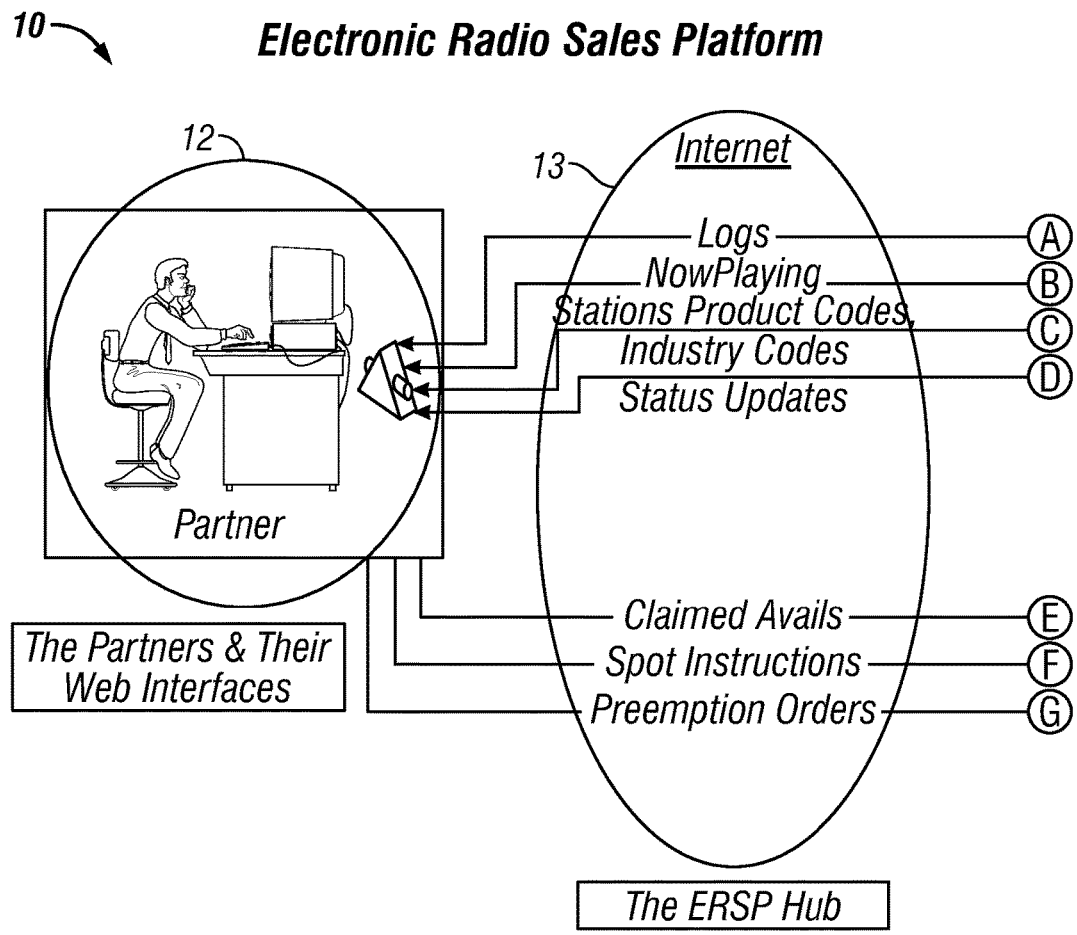
FIG. 1 illustrates a diagram of a system for integrated, automated inventory management and advertisement delivery, in accordance with an embodiment.
Figure 1:
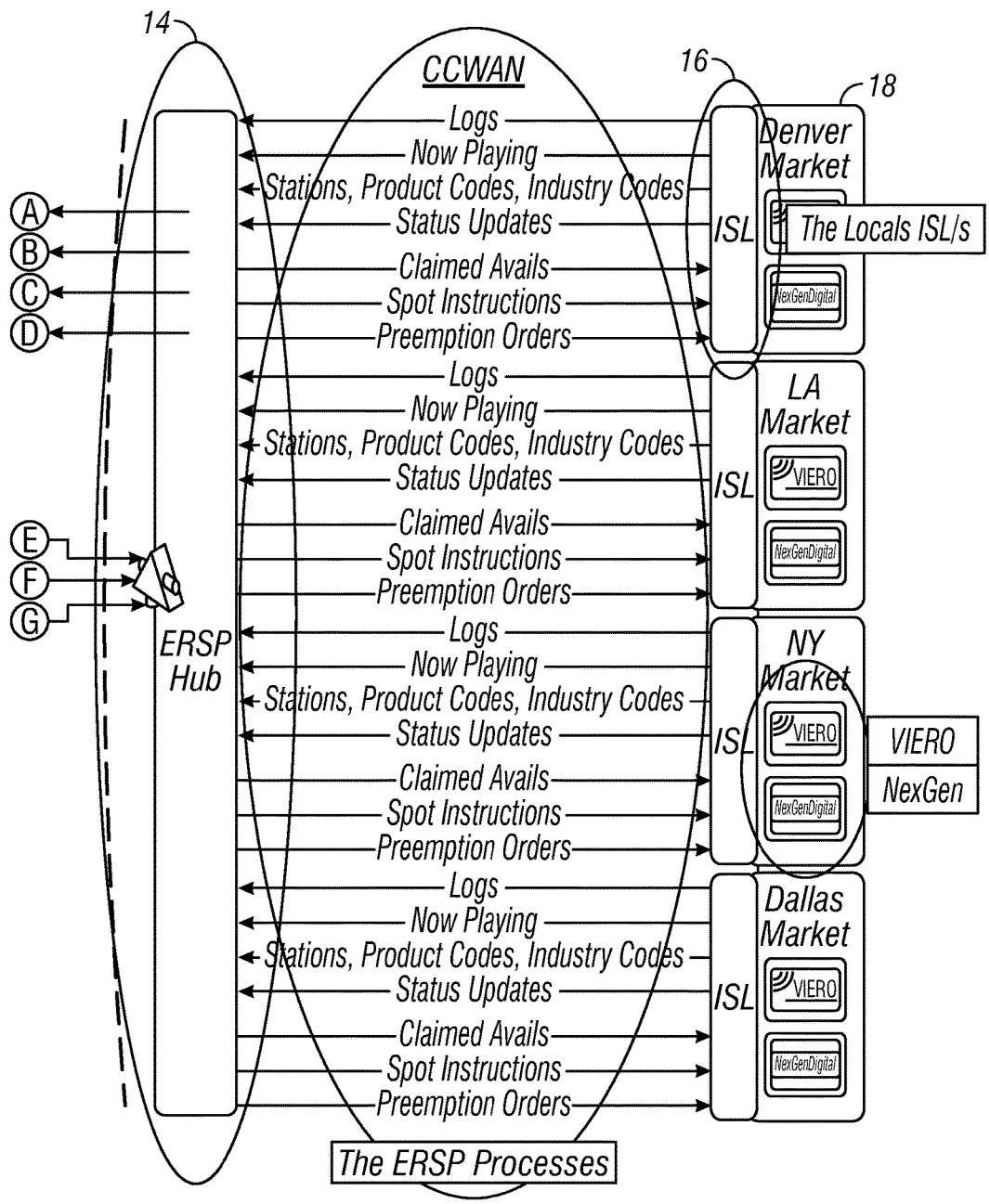

The particular values and configurations discussed in these non-limiting examples can be varied and are cited merely to illustrate at least one embodiment and are not intended to limit the scope thereof.

A system and method for integrated, automated inventory management and advertisement delivery are disclosed herein. One embodiment may be configured to include four major components, although it can be appreciated that fewer or additional components may be implemented in accordance with alternative embodiments and depending upon considerations. The first component is a local market's Traffic and Billing System and Audio Delivery System. Such systems constitute the transaction delivery components for order processing, billing, and the content that is aired. The second component is the local market ISL (Integrated Services Layer) System. This second component serves as a gateway to inject, extract, organize, and route messages and audio into Traffic and Billing and Audio Delivery back and forth to the Hub. The third major component is the Enterprise Hub, which acts as the "traffic cop" for instructions, messages, and audio content from the local ISL's and the Partner layer. The Enterprise Hub is, in essence, the aggregation layer for all connected ISLs and partners.

The last component is the Partner system, which can also be referred to as simply the "Partner" or "Partners" or lower case "partner". The Partner is generally the outward electronic interface to external partners for transacting orders, provision of Audio content, and for reviewing proof of performance. Partners are typically entities that act as advertising brokers, selling advertising in systems. Usually partners sell advertising on a national or regional level that is placed on local radio stations. Whatever advertising time slots (avails) that are not sold nationally by partners is left available to local radio stations to sell locally (e.g., to local advertisers). Combined, the components can provide a mechanism to deliver from a centralized location, the order details and audio content in a near real time "one-to-many" fashion to multiple locations. Such components also provide for automated acknowledgment and a high degree of guaranteed delivery for electronic messages.

The embodiments described herein provide a system and method for transacting business just in time (J.I.T.) through the use of a Partner interface, centralized Hub, and local market ISLs that act as web service gateways into distributed Radio Traffic and Billing and Audio Delivery Systems. Partners can place ads, for example, on a J.I.T. basis. The embodiments described herein also provide a system and method whereby partners claim inventory predefined prior to air time. If this inventory is not claimed, a method is invoked to release this inventory back to the local Traffic and Billing System for use by local users. Note that term "just in time" or "J.I.T." as utilized herein refers generally to a strategy or approach to production and distribution that emphasizes flexible processes and reduces inventories to decrease costs and improve responsiveness.

Embodiments also provide a system and method for providing aggregated "Push-Now Playing" Streams from the Audio Delivery System. In essence, this system and method provides a ticker feed that indicates what content items has just begun to air and the next nine items in the queue. Likewise, embodiments provide a system and method to replace advertising audio content up to, e.g., 15 minutes prior to the time that the content is aired. Embodiments provide a system and method for Near Real Time automatic make good of advertisements that did not air due to a failure. The failed advertisements are "re-inserted" into a future slot with potentially adjusted priority levels.

Embodiments additionally provide a system and method to automatically and, in near real time, synchronize playlist audio Metadata between the Traffic and Billing system and the Audio Delivery System. This functionality enriches business logic between what were once separate and disparate systems. Furthermore, embodiments provide a system and method for an intuitive shuffle component to allow movement of advertisements within a commercial break to accommodate last minute automated changes to the on-air schedule while avoiding business rule violations.

Embodiments of the system and method for integrated, automated inventory management and advertisement delivery described herein can essentially manage two separate streams of commercial radio inventory whereas one stream can release its inventory back to the other stream. Accordingly, the embodiments described herein provide a number of advantages, including an ability to share inventory between two or more distinctly separate inventory streams to an enterprise inventory parent, an ability to allow a "partner" automated interconnectivity into inventory systems, an ability to apply business logic to the release of inventory from the child systems back to the parent, an ability to provide visual indications to the operators of the inventory release 24 hours prior to air time, an ability to substitute audio content very near (e.g., 15 minutes prior) to airtime, a "Push Now Playing" feature that gives real time transaction verification, an automated "make goods" feature, and an auto shuffle feature that is an automated function so if changes occur in the delivery system a shuffle will automatically take place.

FIG. 1 illustrates a diagram of a system 10 for integrated, automated inventory management and advertisement delivery, in accordance with an embodiment. System 10 generally includes one or more partner web interfaces or systems 12, which connect to other components of system 10 through a network 13 (e.g., the Internet), an enterprise (or electronic radio sales platform "ESRP") hub 14, one or more local market integrated services layer systems (ISLs) 16, and one or more local market transaction delivery systems 18. Partner web interfaces 12 are the last or fourth component of the four major components described above, the partner system or partner layer. This is the outward electronic interface to external partners for transacting orders, providing audio content, and for reviewing proof of performance.

System 10 will typically have a plurality of partners and, hence, a plurality of partner web interfaces 12. The enterprise hub 14 is the third major component described above. The enterprise hub 14 acts as the "traffic cop" for instructions, messages, and audio content from the local ISL's and the partner layer. In essence, enterprise hub 14 is the aggregation layer for all connected ISLs and partners. ISLs 16 are the second major component described above and serve as a gateway to inject, extract, organize, and route messages and audio into local market transaction delivery systems 18 and back and forth to the hub 14. Local market transaction delivery systems 18 are the first major component described above and handle and deliver order processing, billing, and the content that is aired. Transaction delivery systems 18 include the local market's traffic and billing system and audio delivery system. These systems here are illustrated as VIERO RMS™ and NexGen Digital™, respectively, although other such systems may be used. System 10 typically includes a plurality of local markets, i.e., radio stations, and therefore a plurality of local market transaction delivery systems 18. In other words, each local radio station in system 10 has a corresponding ISL 16 and local market delivery system 18 (in this example, a VIERO RMS™ and NexGen Digital™). The components illustrated herein may also be referred to as layers (e.g., ISL layer and transaction delivery layer).

With continuing reference to FIG. 1, various processes of system 10, which include transactions or communications between the layers, are illustrated. For example, logs, "now playing" data, identifications of stations, product codes, industry codes, and status updates generated and sent by transaction delivery systems 18 are shown being transmitted from ISLs 16 to enterprise hub 14 and to partner web interfaces 12. Likewise, claimed avails, spot instructions, and preemption orders generated and sent by partners at partner web interfaces 12 are shown being transmitted to enterprise hub 14 and to ISLs 16 for delivery to transaction delivery systems 18. These transactions are explained in more detail below.

Figure 2A:
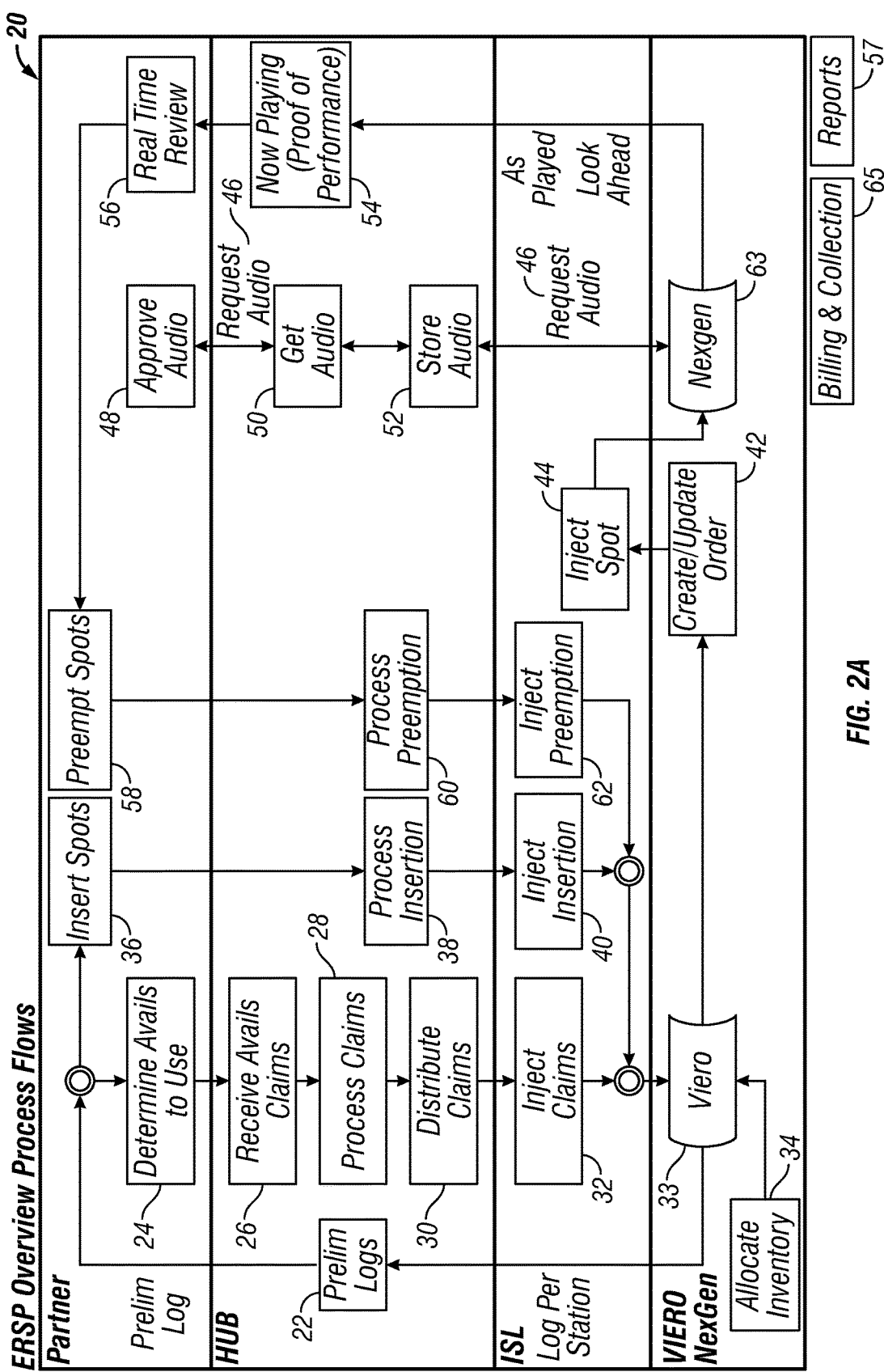
FIG. 2A illustrates a flow diagram of a method for integrated, automated inventory management and advertisement delivery, in accordance with an embodiment.

With reference now to FIG. 2A, a flow diagram is depicted illustrating exemplary overall process flows for system 10 and method 20 for integrated, automated inventory management and advertisement delivery. Partners accessing system 10 at partner web interfaces 12 will seek to insert spots (e.g., advertisements) into programming (e.g., radio programming) on various radio stations. Preliminary logs automatically and regularly transmitted from local market transaction delivery system 18 to the partner web interface 12 via the enterprise hub 14, block 22, will inform partner of avails (i.e., slots of time available for a spot or other programming) for various radio stations. In other words, the preliminary logs display dedicated avails inventory available on local radio stations of system 10. Indeed, these logs are sent from multiple local market transaction delivery systems 18 on a per station basis.

A preliminary log shows aspects of a radio station's schedule for a day. Specifically, a preliminary log shows the partner's contracted avails in the station's schedule and the surrounding programming, or context, for the partner's avails. A partner contracts for these avails and may choose to use its contracted avails or not use them (this is the avails claiming process discussed herein); the surrounding programming is reserved for the station's use. A preliminary log is called "preliminary" because the preliminary log has not been updated with the partner's avails claims; the preliminary log is the log sent prior to the partner submitting its avails claims. As discussed herein, the radio stations send their "final" preliminary log at midnight, twenty four hours before the day shown in the log (the "day of play"). Partners know this is the final version of the preliminary log and that the station cannot subsequently change the preliminary log. The radio stations may send earlier versions of the preliminary log prior to this time and the partners understand that these earlier versions may change. However, these earlier versions enable partners to anticipate what the final preliminary log may be and make initial determinations of avails claims. The final preliminary log sent at midnight, twenty-four hours before the day of play, may remain unchanged from an earlier version. On a given night on which a radio station transmits its final preliminary log at midnight for the day of play, the radio station may also transmit any number of preliminary logs for subsequent days (e.g., radio station transmits at 12:00 AM Monday the final preliminary log for Tuesday, and preliminary logs for Wednesday-Friday). These other non-final preliminary logs may be changed any number of time before their "final" deadline or remain unchanged.

A brief word about logs before proceeding further: local market transaction delivery systems 18 generate and maintain logs, their actual or local logs, representing the local station(s)'s schedule for each day. The preliminary logs transmitted to system 10, as discussed above, are copies of the local logs. The preliminary logs transmitted to system 10 are used by partners, or others, to claim avails and to insert the actual spots, as discussed herein. Avail claims are communicated to the local market transaction delivery systems 18 and inserted into the local logs. On the day of play, the local log will be the actual, planned schedule of spots, or playlist, for the local station, including spots ordered and scheduled for partners, or others, and local market spots. This playlist will be merged with the other programming (e.g., songs, talk show, news, etc.) to form the radio station playlist for the day.

Figure 2B:
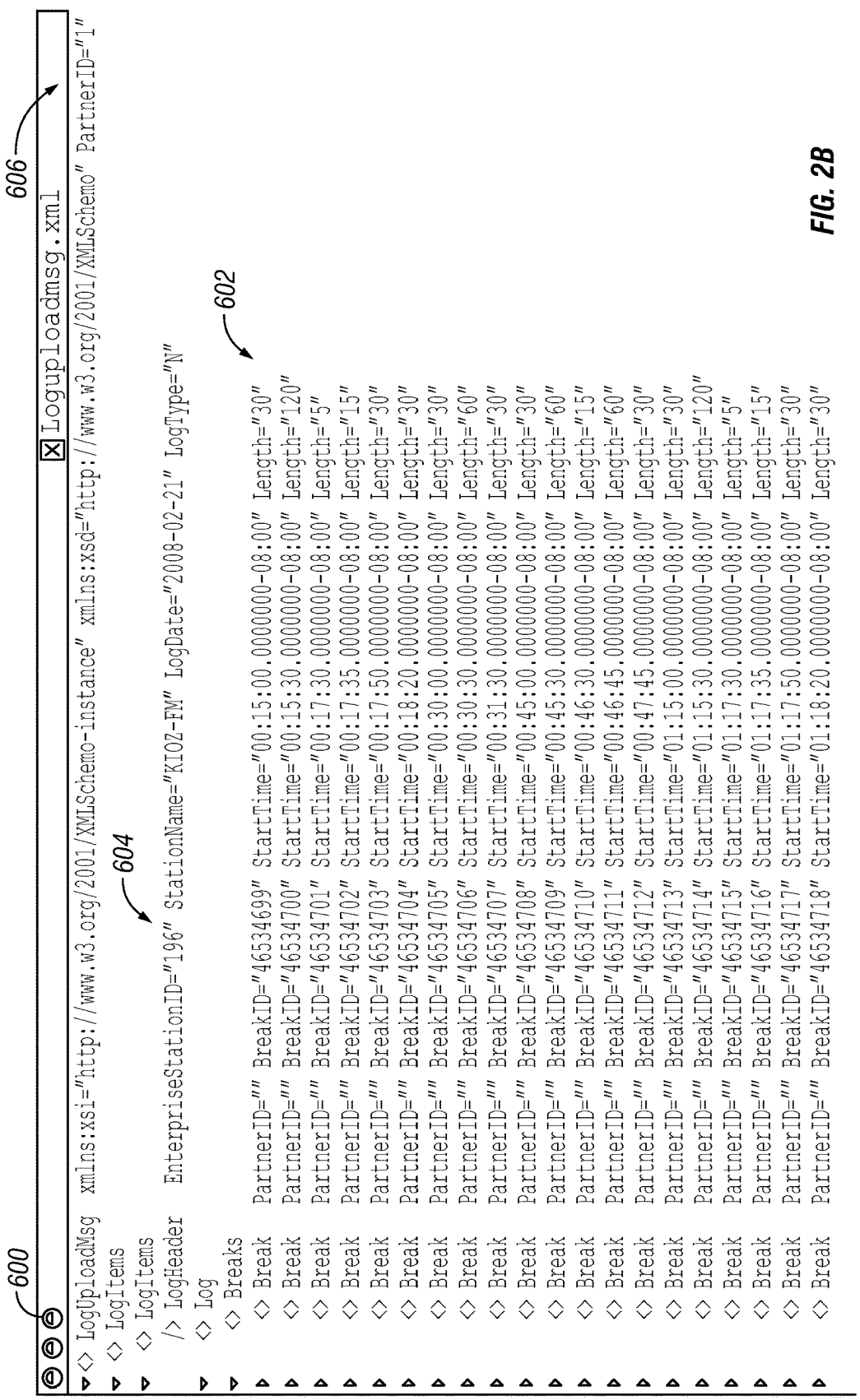
FIG. 2B illustrates an excerpt of an exemplary preliminary log.

With reference now to FIG. 2B, shown is an excerpt from an exemplary preliminary log 600. In an embodiment, preliminary log 600 is an XML file with metadata described herein. Preliminary log 600 lists a series of advertising breaks 602, listed as "Breaks" in preliminary log 600. The breaks 602 include a "Partner ID." If the Partner ID is null (" "), the break 602 is reserved for the local market's use (advertising sold by the local radio station). If the break 602 is one of the partner's contractually reserved breaks, the Partner ID will have a number (e.g., "1") identifying the partner. The breaks 602 also include a "Break ID" (e.g., a unique ID number identifying the specific break), a "Start Time" (e.g., shown by time of the day that the break starts ("−8:00 indicates time from GMT"), and a duration or "Length" (e.g., shown in seconds). Preliminary log 600 may also include a header 604 which includes an Enterprise Station ID (e.g., a unique ID number indentifying the station for whom the break 602 are listed), the "Station Name" (e.g., station call sign), the "Log Date" (e.g., date 24 hours before day for which break 602 are listed), and "Log Type" (e.g., "N" or "R"). Log type N indicates that the log is a normal log; a normal log has been created by the station and transmitted to the partner without change. The first time the station creates a log and transmits it to the partners, it is a normal log and is given Log Type N. The Log type R indicates that the log 600 has been regenerated, i.e., that the log 600 has been changed since a previous version. This is a trigger or cue for the partner that the preliminary log 600 has changed and that the partner may need to adjust avails claim decisions it may have already made. Preliminary log 600 may also include a Partner ID 606 indicating the partner to whom preliminary log 600 was sent. In an embodiment, the final preliminary log 600 will typically be sent at midnight, twenty-four hours before the day for which the breaks 602 are listed (e.g., preliminary log sent at 12:00 AM Monday morning listing breaks 602 for one day later, Tuesday, starting at 12:00 AM Tuesday).

With continued reference to FIG. 2A, partner will use partner web interface 12 to view preliminary logs, listed avails, and other log information. Partner will determine what avails to use based on this information and enter the selected or claimed avails into partner web interface 12, block 24. Partner web interface 12 will transmit this information, the partner's avails claims (i.e., the partner's contractually-reserved breaks for which the partner wishes to submit an ad or spot), to an enterprise hub 14. Typically, this occurs sometime almost immediately after midnight, i.e., almost immediately after the final preliminary log is sent (e.g., for Tuesday day of play, final preliminary log is sent at 12:00 AM Monday morning and avails claims are submitted by 12:05 AM Monday morning). For example, partner may enter and transmit the Break ID for the avails 602 it wishes to claim using partner web interface 12. In an embodiment, partner web interface 12 enables partner to edit preliminary log 600, insert the partner's Partner ID into the breaks 602 it wishes to claim and transmits or uploads the edited preliminary log 600.

With reference now to FIG. 2C, shown is an excerpt of an edited preliminary or uploaded log 610. In an embodiment, uploaded log 610 is an XML file with metadata described herein. The excerpt of uploaded log 610 shows five breaks or avails 612 that are contractually reserved by the partner, Partner ID "1". Three of the avails 612, indicated by AvailClaimInstruction="true", are claimed by the partner. Two of the avails 612, indicated by AvailClaimInstruction="false", are not claimed by the partner. The unclaimed avails 612 will be released back to the local radio station (indicated by "EnterpriseStationID="498"") for local market advertising. The uploaded log 610 also includes a logdate ("LogDate"). Although not shown in uploaded log 610, uploaded log 610 may include Industry Codes and Product Codes for the advertisers and advertising which partner will insert advertisements in each of the claimed avails 612. The Industry Codes are codes that identify the type of industry of the advertiser and Product Codes are codes that identify the type of product, enabling system 10, particularly transaction delivery systems 18, to identify advertising conflicts and avoid airing advertisement from the same industry (e.g., from competitors) too closely together. Alternatively, Product Codes and/or Industry Codes will be included in the partner's spot insertion/preemption messages (See Insert Spots 36 and Preempt Spot 58 in FIG. 2A).

Referring back to FIG. 2A, enterprise hub 14 will received the avail claims (e.g., the uploaded log 610), block 26, and process the avail claims, block 28. When processing avail claims 28, enterprise hub 14 may create a revised preliminary log for each market in which the partner is submitting an avail claim. Enterprise hub 14 inserts avail claims into the log for each market to create a preliminary revised log. In other words, in place of avails shown in preliminary logs, enterprise hub 14 inserts partner's claims. Enterprise hub 14 may receive 26 claims (e.g., uploaded logs 610) from multiple partners and may process 28 them all together to form one preliminary revised log for each local market.

After processing, enterprise hub 14 distributes the avail claims to the various ISLs 16 for local markets in which the partner has submitted an avail claim, block 30. The ISLs 16 receive the claims and inject the claims into actual or local logs of local market transaction delivery systems 18, block 32. Local market transaction delivery systems 18 allocate inventory in their logs, as indicated at block 34, and receive the injected claims. In the example shown, a VIERO RMS™ delivery system may be utilized to perform these actions as depicted, for example, at block 33 in FIG. 2A. Local market transaction delivery systems 18 update the local logs (e.g., the preliminary logs 600 transmitted as described above) and transmit the updated logs to the partner web interface 12 via the enterprise hub 14. Indeed, as noted above, these updated logs are sent from multiple local market transaction delivery systems 18 on a per station basis. The updated logs may include a status of the claimed avails. Consequently, partner web interfaces 12 receive the updated logs from multiple stations to which they have sent avail claims.

With continued reference to FIG. 2A, based on the updated logs, the partner web interfaces 12 insert spots, as indicated at block 36. In other words, the partner web interfaces 12 can transmit spots for insertion into the local logs. This typically occurs around 9:00 PM the day prior to the airing of the spots. Enterprise hub 14 determines to which ISL(s) 16 to transmit the insertion. ISL 16 receives and injects the insertion into the appropriate local market transaction delivery system 18, block 40. Local market transaction delivery system 18 creates or updates an order, block 42. An order is a standing order or placeholder for a spot. Partners indicate they want to place a spot in a certain time slot, e.g., 24 hours before the slot. By certain time of day, they provide the spot. Up to a certain time, e.g., 15 minutes, before the slot, they can swap out the spot for another spot (a.k.a., a "preempt"). After creating or updated the order 42, local market transaction delivery system 18 injects the spot into its log, block 44. If multiple local market transaction delivery systems 18 are used locally (e.g., for a radio station or stations), as shown here (e.g., a VIERO RMS™ and a NexGen Digital™ system are used), local market transaction delivery system 18 may transmit the spot 44 through ISL 16. As shown here, VIERO RMS™ transmits insertion through ISL 16 to NexGen Digital™ system. Note that in FIG. 2A, a "NexGen" system or processing operation is indicated at block 63. Billing and collection operations are depicted in FIG. 2A as depicted at block 65. Additionally, a process or logical operations for generating reports and other data are indicated at block 57.

If a new spot is inserted, local market transaction delivery system 18 requests the audio, block 46. Enterprise hub 14 forwards the request to the partner web interface 12, partner approves the audio, block 48, enterprise hub 14 gets the approved audio, block 50, and stores the approved audio for future access, block 52. Local market transaction delivery system 18 receives the audio from enterprise hub 14. If the spot is a previous spot, the audio may be retrieved from the storage at the enterprise hub 14.

With continued reference to FIG. 2A, local market transaction delivery system 18 transmits a Now Playing record of the spot as it plays in real-time to the enterprise hub 14, block 54. This record is transmitted on system 10 Push Now Playing feature. As described above, the Push Now Playing feature is a continuous, ticker feed that enterprise hub 14 makes available for viewing on partner web interface 12, enabling the partner to perform a near real-time review, block 56, of the spot. Based on the near real-time review, a partner may decide to preempt a spot, block 58. A spot preemption would insert a different spot or some other content in place of an already injected spot. The preemption content is transmitted to enterprise hub 14, which processes the preemption, block 60, determining to which local market the preemption should be transmitted. Enterprise hub 14 forwards the preemption to the appropriate ISL(s) 18, which injects the preemption, block 62, so that local market transaction delivery system 18 may inject as described above (see 42-44). Local market transaction delivery system 18 may also generate reports, block 57, and conduct billing and collection, block 65, for display and action through partnership web interface 12.

The near real time review provided by the Push Now Playing feature allows near real time verification of played spots and automatic rendering of advertisements that did not air correctly due to a failure. Advertisements that air successfully within parameters established by a particular order are acknowledged and marked as verified within seconds after they play. Any failed advertisements are acknowledged and marked as "exceptions" within seconds and then automatically "re-inserted" by local market transaction delivery system 18 into an appropriate future slot, e.g., through the use of a dynamic Booking Agent (e.g., a VIERO RMS™ sub-system), such as that disclosed in U.S. Patent Application Publication No. 2007/0271134, entitled "System and Method for Scheduling Advertisements," which is incorporated herein by reference in its entirety. The failed spot may be re-inserted with potentially adjusted priority levels to ensure successful execution. This process utilizes synchronous near real time communication method that then triggers business rules and scheduling algorithms to perform a once fully manual belated process.

Figure 2D:
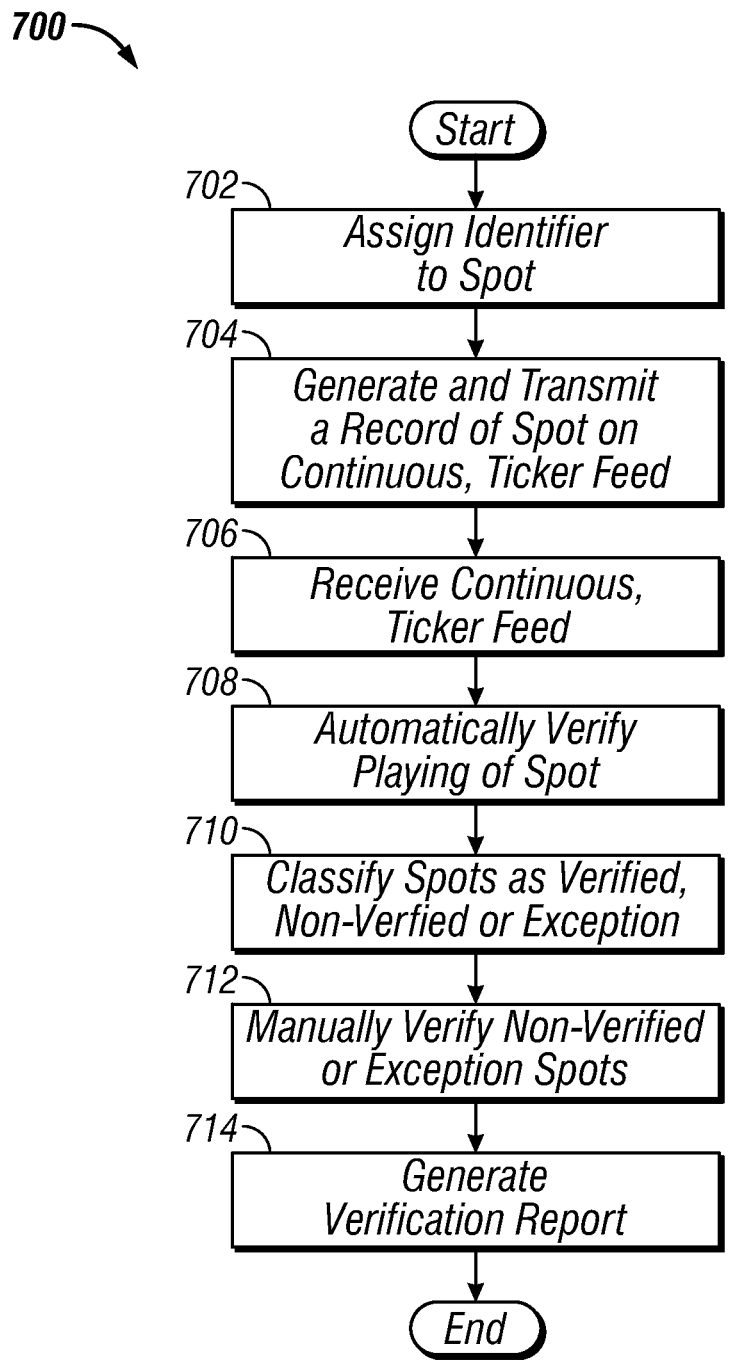
FIG. 2D illustrates a flowchart illustrating an exemplary near real-time or real-time verification process.

With reference now to FIG. 2D, a flow chart of logical operations is depicted illustrating an embodiment of method 700 of near real time verification. Method 700 utilizes continuous, ticker feed (e.g., Push Now Playing) to perform near real time verification of played spots. Spots in logs (e.g., preliminary log 600, uploaded log 610 and local logs) include an identifier number (e.g., BI_ID) that identifies each spot. Accordingly, method 700 assigns identifier to spot, as illustrated at block 702. When spots are inserted (see blocks 36-40 in FIG. 2A), identifier number is transferred to the appropriate local market transaction delivery system 18 (the local market's media traffic and billing system and audio delivery (or "on-air") system) with other spot information. When the spot is played, a record of the spot playing is generated and transmitted, e.g., on the continuous, ticker feed, as described at block 704. Local transaction delivery system 18 typically generates and transmits the continuous, ticker feed. The record includes identifying information. The following is an exemplary XML file indicating contents of a record from the ticker.

| Key | XML Elements | |
|---|---|---|
| 1 | Header | |
| 2 | | StationID |
| 3 | | Time |
| 4 | | Date |
| 5 | Data | |
| 6 | | SpotInstanceID |
| 7 | | CartNumber |
| 8 | | Title |
| 9 | | ISCICode |
| 10 | | ActualTime |
| 11 | | VerifiedStatus |
| 12 | | Industry Code |
| 13 | | Product Code |
| 14 | | SpotLength |
| 15 | | Rate |
| 16 | | CreativeID |

-continued

| Key | XML Elements |
|---|---|
| 17 | FilePath |
| 18 | InsertionType |

As shown, in an embodiment, the continuous, ticker feed with include a stream of messages, formatted as XML messages, which include data about spots played by the station. The messages, as shown above, may include data identifying the station (StationID), the ordered or scheduled time for the spot (Time), the ordered or schedule date for the spot (Date), the BI_ID (SpotInstanceID), a cart number, which is a unique legacy number assignment given to audio files at the local level (CartNumber), spot title (Title), an industry standard commercial identifier (ISCICode), the actual time and date the spot aired (ActualTime), a on-air system code or verification status that indicates, e.g., whether the spot aired as ordered, aired outside its scheduled time, or did not air and which is used in the verification process described herein (VerifiedStatus), a code identifying the relevant industry for the product/service advertised in the spot (Industry Code), a code identifying the product/service advertised (Product Code), the spot length as aired (SpotLength), the rate charged for the spot (Rate), data identifying the spot creator (CreativeID), a file path for the spot (FilePath), and an indication whether the spot was inserted normally or conditionally. In an embodiment, normally indicates the spot was inserted directly into an avail, e.g., selected by a partner, while conditionally indicates that the spot was inserted into an avail based on or using a set of conditional rules. U.S. Provisional Application Ser. No. 61/129,961, entitled "System and Method for Providing Conditional Advertising", filed Aug. 1, 2008, which is hereby incorporated by reference, describes an embodiment of a system and method for conditionally inserting spots, including exemplary conditional rules and a conditional rules engine for conditionally inserting spots.

Accordingly, validation may be achieved by comparing the log for the local market transaction delivery system 18, which contains a scheduled list of spots ("x"), against the continuous, ticker feed, which contains a list of actually aired spots ("y"). The difference or delta between x and y determines which spots aired when scheduled, and may be verified, and which spots did not air when scheduled, and are not verified (may be subsequently manually verified). The continuous, ticker feed preferably includes a running indication of the corresponding time. Alternatively, the identifying information in the record may also include a specific record of the air time. Often, there is a delay built into the display of the continuous, ticker feed. For example, the continuous, ticker feed may be delayed ten minutes from real time. The delay is typically not in the capture of data for the continuous, ticker feed, but rather as a business rule applied to when the data is displayed and received and can be consumed. For example, if the continuous, ticker feed is viewed at 10:37 AM, it will display records for playing or played spots as of 10:27 AM. Alternatively, the feed may be displayed in real-time without any delay. The verification, described herein, may occur immediately on the continuous, ticker feed as it is continuously received (i.e., a real-time verification), or with a delay, such as the ten-minute delay described here.

The continuous, ticker feed is received by a verification system (e.g., a module or other component), block 706, and the playing of the spot is automatically verified, block 708. In an embodiment, local market transaction delivery system 18 includes a verification module (e.g., a Viero RMS NRT (Near Real Time) module) that receives the continuous, ticker feed and performs the verification. In another embodiment, enterprise hub 14 includes verification module accessed via partner web interface 12 that receives the continuous, ticker feed and performs the verification. In yet another embodiment, both modules receive the continuous, ticker feed and perform the verification. Verification determines whether the spot aired and aired within its order parameters (e.g., parameters indicating time frame in which a spot must air and business rules for excluding adjacent ads of conflicting types (no back-to-back automotive brand ads)). If a spot does not air within its order parameters, the advertiser cannot be billed the agreed upon price of the spot.

The identifying information can be utilized to match spots in the local logs, as described above in order to verify the spots. In the embodiment described herein, the local log is the authoritative playlist for content managed by the local transaction delivery system 18. The ticker for each local market delivery system 18 is compared to this local log for verification. At the enterprise hub 14, a partner-specific log, which is a subset of the local log (e.g., each local market delivery system 18 may receive spots from multiple partners; hence, local log will contain spot schedule information for multiple partners), may be used to verify the spots for the partner. For example, the identification number is used to locate and identify the corresponding spot in the verification file (i.e., the local log or partner-specific log). The cart number associated with the spot in the verification file is checked against the cart number in the ticker record for a match, the scheduled air time of the spot is checked against the actual air time, the business rules surrounding order parameters (e.g., no back to back automotive brands), and the on-air system code is checked. If the spot matches up per these criteria, the spot is automatically verified. If, however, the spot does not match up per these criteria, the spot must be manually verified.

Spots are classified to indicate whether they are verified or non-verified or if they are subject to a system exception, as illustrated at block 710 in FIG. 2D. System exceptions indicate various exceptions such as: the spot was not played, the spot was not played due to missing audio, the spot was skipped by on-air system staff, or the event was skipped due to restart of the on-air system. Spots may be non-verified for a variety of reasons including: e.g., on-air system staff moved a spot (the moved spot would retain its identifier information, would air within order parameters, but would air at air time not matching its scheduled air time); on-air system staff had to pull another cart because audio was missing for the spot (the spot record on the feed would return a different cart number); the spot record on the feed had the spot's identifier number, but no on-air system code; the spot record on the feed had the spot's identified number and on-air system code, but aired outside order parameters; or record for spot was not included on continuous, ticker feed (spot was deleted but not re-entered).

With continued reference to FIG. 2D, spots that are classified as non-verified or with exception are manually verified, as indicated at block 712. Manual verification includes searching for unverified spots (spots that are classified excepted, non-verified, or have not been classified beyond their scheduled air-time). The classification or status of the spots may then be adjusted based on what the verifier determines. For example, the spot may be re-classified as verified or, e.g., sent to a pool of spots for rescheduling, changed to a make-good, changed to an auto-fill, or removed from the scheduling process permanently by marking the spot as an exception. Rescheduling is applicable to a spot that did not air and will be re-scheduled to occupy a future spot (e.g., to air in the future). Make-goods are applicable to spots that did not air or aired in violation of an order parameter or business rule; rescheduling is one way of making good. Auto-fill is a term that describes various processes used by system 10 components that feed the audio delivery system. In an embodiment, two or more playlists are merged to produce a final "product" or playlist. One component may be responsible for the commercial content (e.g., the spot playlist indicated by the local log) and another component is responsible for programming content (e.g., song content). Because time is not forgiving, a fallback is provided in the event of error (e.g., a spot was supposed to be sixty (60) seconds but was recorded with only ten (10) seconds of audio). Auto-fills are spots that are used to automatically fill-in the missing time in these circumstances. So, if a spot is changed to an auto-fill, it will be used to automatically to fill such missing time.

A verification report is generated, as indicated at block 714. A verification report may be real-time or near real-time, a constantly updated report displaying the verification status of spots. In other words, as spots are verified from continuous, ticker feed, the verification report is updated with the spots and their status. With reference now to FIG. 2E, shown is an exemplary verification report 750. Verification report 750 illustrates a number of spots and their status. Verification report 750 may be displayed on a user interface and/or discretely generated as a hard-copy report (e.g., displayed on a user interface of or reported through reporting system of local market transaction delivery system 18 or through partner web interface 12 of enterprise hub 14). Instances of verification report 750 may also be e-mailed or otherwise communicated through known methods.

Although shown as a discrete method in FIG. 2D, an embodiment of method 700 is a continuous, ongoing, dynamic process. In other words, spots are continuously airing, continuous, ticker feed is being continuously generated, transmitted, and received, spots are being continuously verified and classified and then manually verified if necessary and verification reports are being continuously and dynamically generated and then updated. Consequently, method 700 shown in FIG. 2D may continuously repeat.

In an alternative embodiment, while the ticker feed is continuous, some verification modules do not consume the date in near real time on a continuous basis. For example, spot information from continuous, ticker feed may be collected, e.g., into a file, and verification is performed on a periodic basis (e.g., once per hour, day-part, day, etc.). In an embodiment, a partner may want to receive a verification report once per day or require that its spots be verified on a daily basis. The records from continuous, ticker feed could be collected into a single file and then analyzed, as described above.

Additionally, whereas continuous, ticker feeds are described as being generated from individual local transaction delivery systems 18, system 10 may consolidate continuous, ticker feeds from multiple local transaction delivery systems 18 into one, system-wide continuous, ticker feed. Such ticker feeds could then be filtered by partner, advertiser, etc., so that each partner, advertiser, etc. saw records only of their spots on the system-wide feed.

Figure 3:
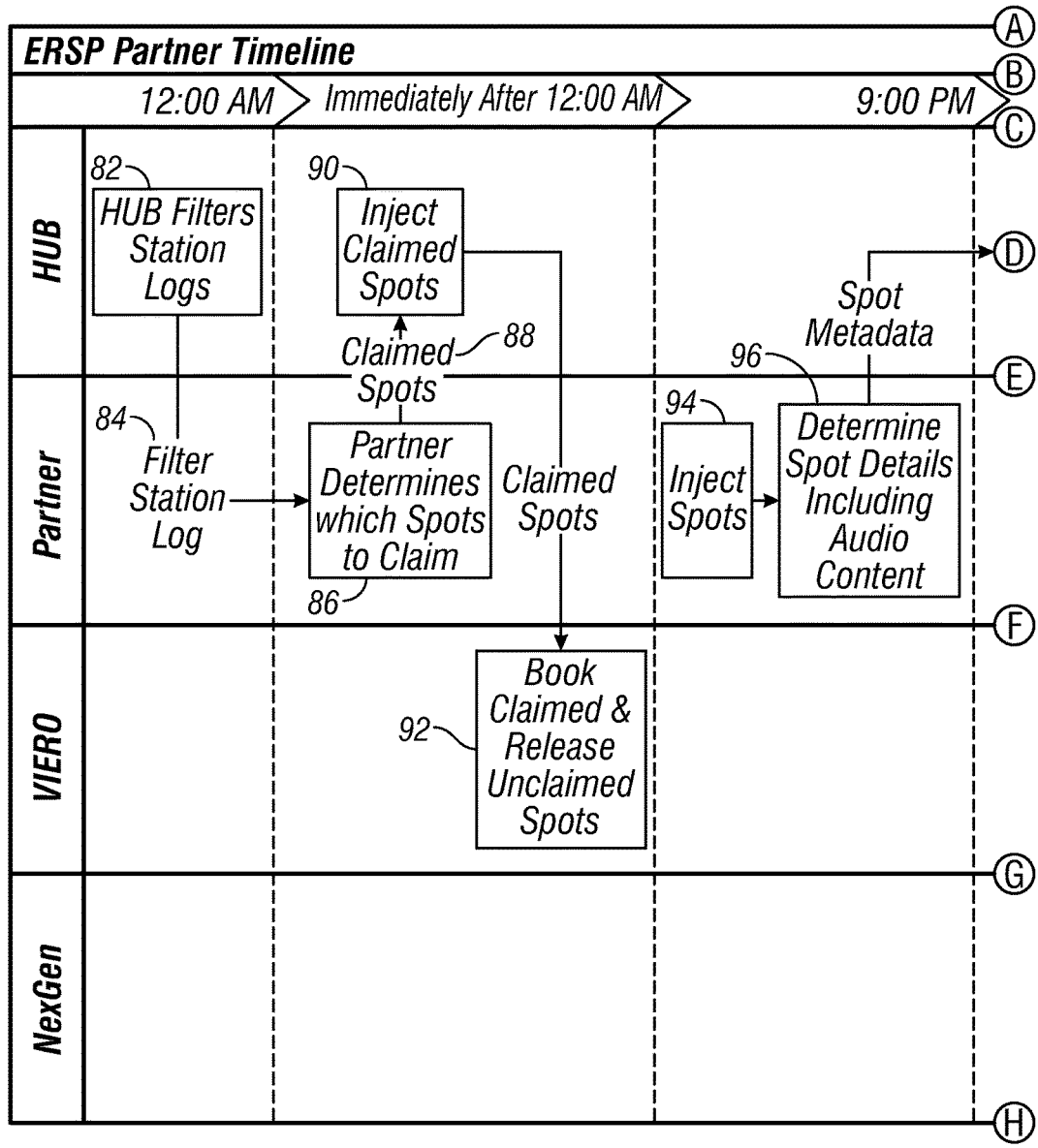
FIG. 3 illustrates a flow diagram illustrating a timeline of an embodiment of a method for integrated, automated inventory management and advertisement delivery.
Figure 3:
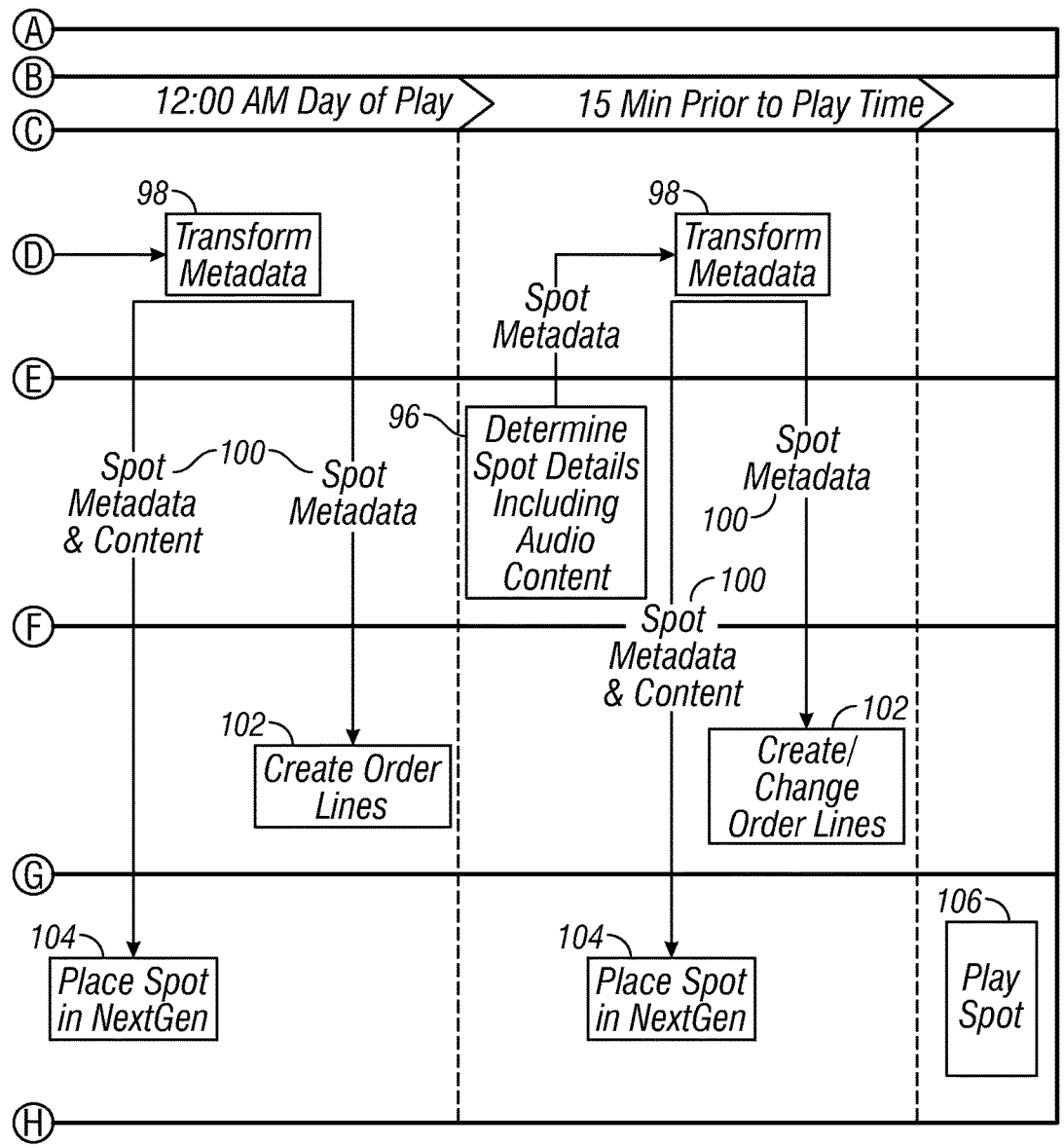

With reference now to FIG. 3, a flow diagram illustrating various processes performed by system 10 along a time-line is illustrated in accordance with an embodiment. The time-line and the processes performed are centered or based upon functions or processes performed by partner and partner web interface 12. The times shown are somewhat arbitrary, but are illustrative of a typical performance of system 10 and method 20. Steps shown in FIG. 3 correspond generally to the steps described above. At 12:00 AM, twenty-four hours prior to day of play, enterprise hub 14 receives and filters station logs from local market delivery systems 18, as indicated at block 82. As noted above, partners act as advertising brokers. Unfiltered local station logs contain the specifics of what spots will be played when, including the identification of the advertiser for each spot. Filtering the station logs removes the identification of the advertiser and any other information that should not be shared with partners.

In place of advertiser identification, logs may indicate type of business advertising for each spot already placed (e.g., instead of McDonalds™, filtered log indicates "restaurant" or "fast-food restaurant"). Filtered log is transmitted to partner web interface 12 for display to partner, block 84. Sometime immediately after 12:00 AM, twenty-four hours prior to day of play, partner makes a final determination of which spots to claim, block 86, and transmits claimed spots to enterprise hub 14, block 88. Typically, this occurs by 12:05 AM day prior to day of play. Enterprise hub 14 injects claimed spots, transmitting the claimed spots to the appropriate local market delivery system(s) 18, block 90. Local market delivery system 18, in this example VIERO RMS™, receives and registers the claimed block or blocks and releases the unclaimed blocks to local market for local market advertising, block 92.

Sometime later, typically prior to and around 9:00 PM day prior to day of play, partner injects spots, block 94 and determines spot details for each of its spots, including audio content and transmits spot metadata using partner web interface 12, block 96. Enterprise hub 14 receives and may transform the spot metadata and the audio content, block 98. The partners typically utilize their own metadata. The partner formatted metadata can be transformed into a format that local transaction delivery systems 18 can use. Enterprise hub 14 transmits spot metadata and audio content to local market delivery system 18, block 100. In the example shown, enterprise hub 14 transmits transformed spot metadata to VIERO RMS™, which creates the details of the partner's orders for avails, i.e., "order lines", block 102, and transmits transformed spot metadata and audio content to NexGen Digital™, which places the spot in its planned playlist for future play, block 104. Blocks 98-104 are performed for each of the partner's claimed avails prior to midnight day of play. These steps are performed iteratively as these steps are repeated for as many spots and as many stations that the partner has placed claims.

With continuing reference to FIG. 3, illustrated is the J.I.T. programming feature of system 10. Blocks 98-104 are shown repeated shortly before airing of a spot, in this example, just prior to 15 minutes before play time. As above, partner determines spot details and transmits 96 spot metadata, in this case, changing the spot details and metadata. Enterprise hub 14 receives and transforms 98 the spot metadata and the audio content. Enterprise hub 14 transmits 100 spot metadata and audio content to local market delivery system. In the example shown, VIERO RMS™ creates or changes 102 order lines (depending on whether new spot or spot preemption (replacement spot) and NexGen Digital™ places 104 the spot in its planned playlist. Accordingly, system 10 allows partner to change or submit a new spot very shortly before playtime, e.g., up to 15 minutes prior to air time (time can be set closer to air time—15 minutes allows sufficient margin of error to avoid potential problems—e.g., network congestion, communication problems or failures, corrupted files, etc.). At play time, local market delivery system 18 will play spot, block 106. In the example shown, NexGen Digital™ plays spot from its planned play list.

Figure 4:
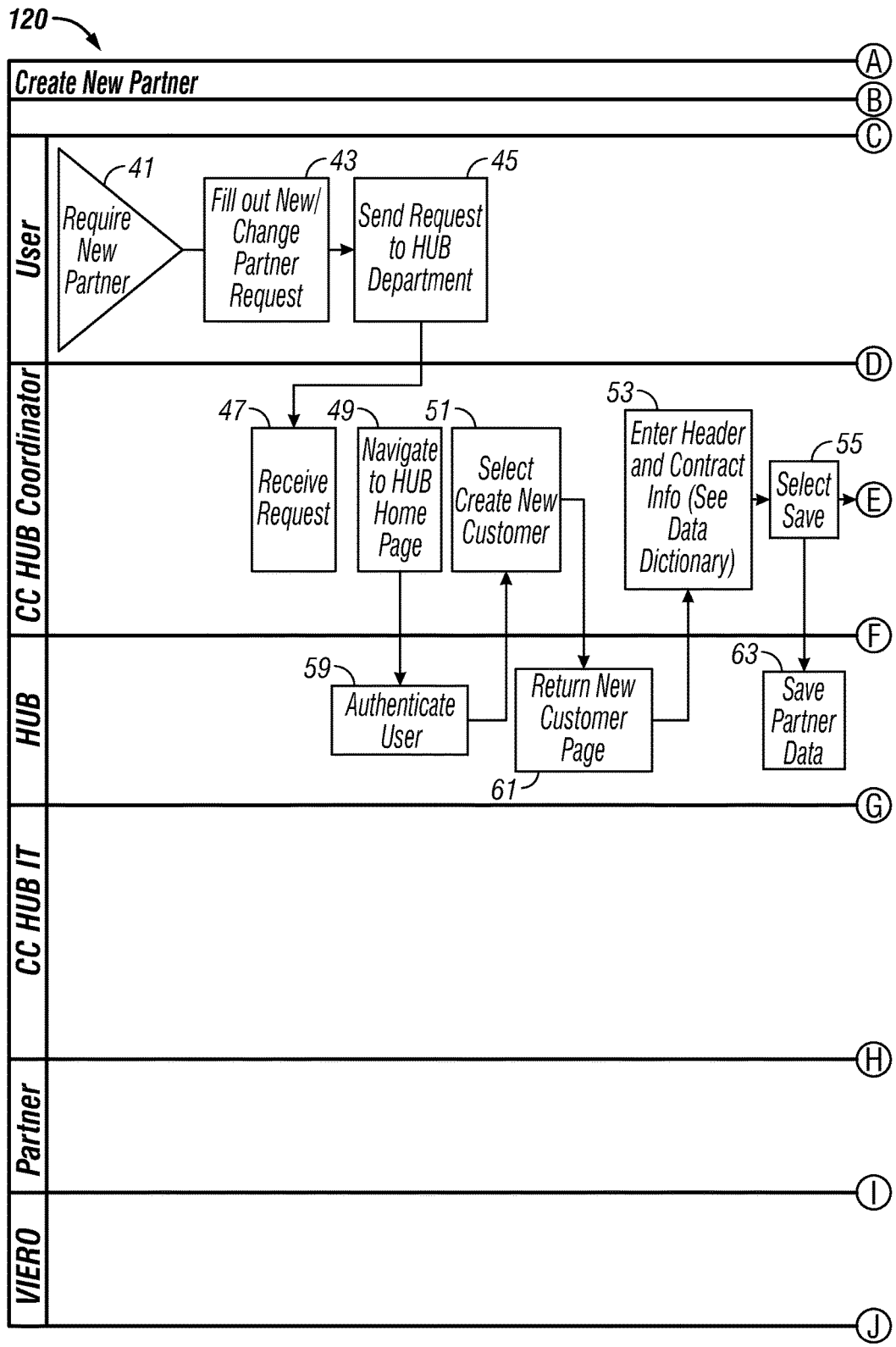
FIG. 4 illustrates a flow diagram of a method of adding a new partner in an embodiment of a system for integrated, automated inventory management and advertisement delivery, in accordance with an embodiment.
Figure 4:
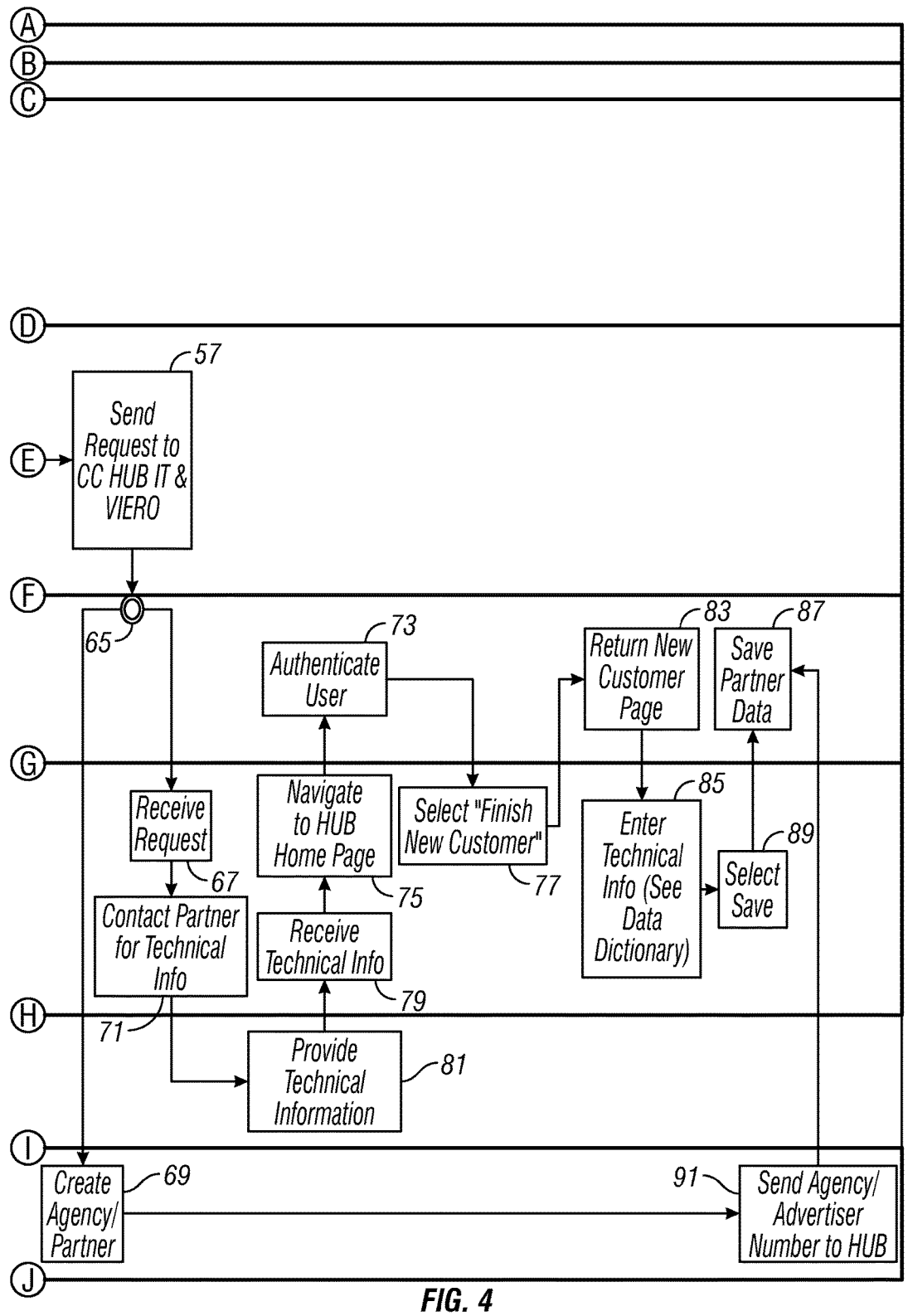

With reference to FIG. 4, a method 120 for configuring a new partner is illustrated, in accordance with an embodiment. As indicated in FIG. 4, an operation is depicted as indicated at block 41, in which it is determined that a new partner is required. Next, as illustrated at block 43, a new/change partner request form may be filled out. Thereafter, as depicted at block 45, the request resulting from implementation of the operation depicted at block 43 can be sent to the enterprise hub department, also referred to simply as the "HUB". Next, as indicated at block 47, the request is received and thereafter, as indicated at block 49, an operation can be implemented in which a user "navigates" to the HUB home page. Note that the term "home page" refers generally to the URL (Universe Resource Locator) or local file that automatically loads when a web browser starts or when the browser's "home" button is pressed. The term "home page" may also refer to the front page, web server directory index, or main web page of a website of a group, company, organization, or individual.

Following the processing of the operation depicted at block 49, an operation can be processed to authenticate the user, block 59. Thereafter as illustrated at block 51, an operation can be implemented to select a "create new customer" option. Next, the utilized web browser may return to a new customer page, as described at block 61. An operation may then be processed, as indicated at block 53, in which header and contact information are entered. Thereafter, a "save" option may be selected as depicted at block 55. Next, as shown as block 63, partner data may be saved. Additionally, an operation can be implemented, as indicated at block 57, to send the request to the HUB IT department and VIERO (e.g., see block 33 in FIG. 2A).

Several options are then possible, as indicated by block 65. For example, following the processing of the operation illustrated at block 57, agency/partner may be created as indicated at block 69 and an agency/advertiser number sent to the HUB, as illustrated at block 91. Alternatively, a "receive request" operation can be processed, as indicated at block 67, followed by an operation in which the partner is contacted for technical information, as indicated at block 71. Thereafter, as indicated at block 81, the technical information may actually be provided and then received, as illustrated at block 79. Next, a navigation operation can be implemented as shown at block 75, which involves navigation to the hub home page. Note that the operation depicted at block 75 is analogous or similar to the operation illustrated at block 49.

Following the processing of the operation at block 75, an authentication operation can be implemented, as indicated at block 73, in which the user is authenticated. Again, note that the operation depicted at block 73 is analogous or similar to the operation described at block 59. Following the processing of the operation illustrated at block 73, a "finish new customer" option can be selected, as depicted at block 77. Thereafter, as indicated at block 83, a new customer page can be returned and then technical information can be entered, as indicated at block 85. A save operation can then be implemented as indicated at block 89, followed by the saving of partner data, as described at block 87. Note that the operation illustrated at block 87 may also occur following processing of the operation illustrated at block 91.

Method 120 can thus be applied with respect to system 10 to create a new partner. In general, a user fills out a new change partner request as indicated at block 43 and sends the request to the enterprise hub department, as depicted at block 45. A hub coordinator receives the request as indicated at block 47 and navigates to an enterprise hub home page, as shown at block 49. The enterprise hub 14 authenticates the user, as described at block 59. The HUB coordinator selects a "create a new customer" option, as indicated at block 51 and then the enterprise hub 14 returns a new customer page, as shown at block 61. The hub coordinator enters contract and other info, as depicted at block 53, then selects to save new partner data, as illustrated as block 63, and sends a request for a new customer to the enterprise hub IT staff and local market delivery systems 18 (in this case VIERO RMS™) for every local market in system 10 as indicated at block 57. The enterprise hub 14 saves the new partner data as depicted at block 63 and awaits further input from enterprise hub IT staff.

Note that local market delivery systems 18 may receive a request as indicated at block 67 to create a partner. Note that in FIG. 4, the partner can be referred to as "agency partner" (e.g., see block 69), because the partner, which acts as an advertising broker, may be considered to have an agency relationship with system 10. Subsequently, local market delivery systems 18 will send agency partner's advertiser number to enterprise hub 14. This advertiser number will be used to reference the new partner in future communications with local market delivery systems 18.

With continuing reference to FIG. 4, the enterprise hub IT staff receives the request and contacts the new partner for technical information. The new partner provides the requested technical information. Enterprise hub IT staff receives the technical information and navigates to enterprise hub home page. Enterprise hub authenticates the IT staff user. Enterprise hub IT staff selects a "finish new customer" option, enters technical information received from new partner in new customer page returned by enterprise hub 14, and selects to save new partner data. Enterprise hub 14 saves new partner data entered by enterprise hub IT staff along with advertiser number forwarded by local market delivery systems. 18.

Figure 5:
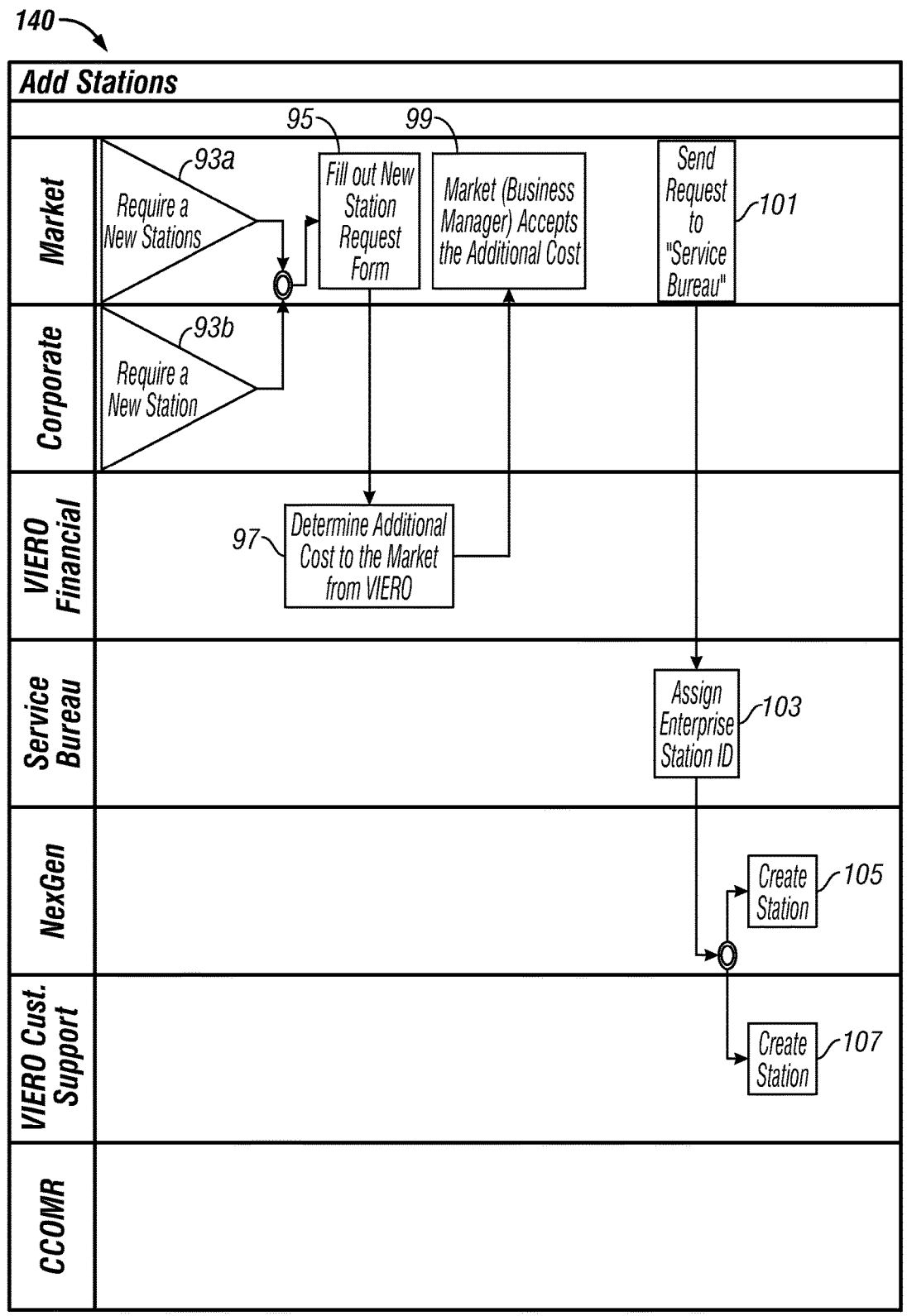
FIG. 5 illustrates a flow diagram of a method of adding new stations in an embodiment of a system for integrated, automated inventory management and advertisement delivery, in accordance with an embodiment.

With reference now to FIG. 5, shown is a method 140 of adding new stations to system 10. As indicate at block 93A, an operation for requiring new stations is indicated. A similar operation is also shown at block 93B. At the local market, or elsewhere, a user (e.g., business manager) fills out a new station request form as indicated at block 95. A financial department, in this example, a VIERO RMS™ financial department, determines the cost to the local market of adding the new station as indicated at block 97. The user at the local market accepts the additional cost, as shown at block 99, and sends a request, as indicated at block 101, to the service bureau mentioned above. The service bureau assigns a station ID to the new station as described at block 103 and then "creates" the station in the local market delivery system 18 (in this example in NexGen Digital™ and VIERO RMS™) as indicated at blocks 105 and 107.

Figure 6:
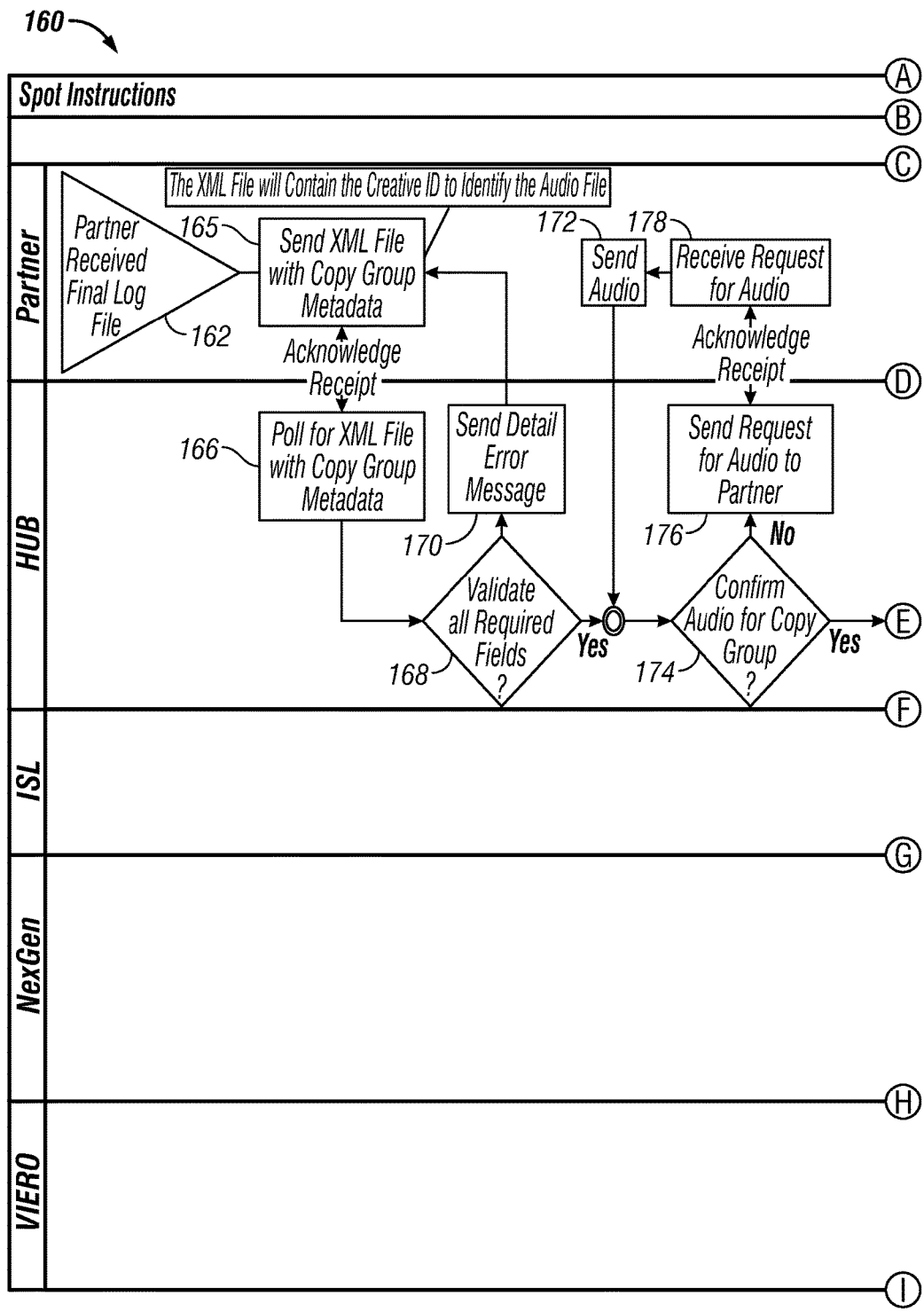
FIG. 6 illustrates a flow diagram of a method of providing spot instructions in an embodiment of a system for integrated, automated inventory management and advertisement delivery, in accordance with an embodiment.
Figure 6:
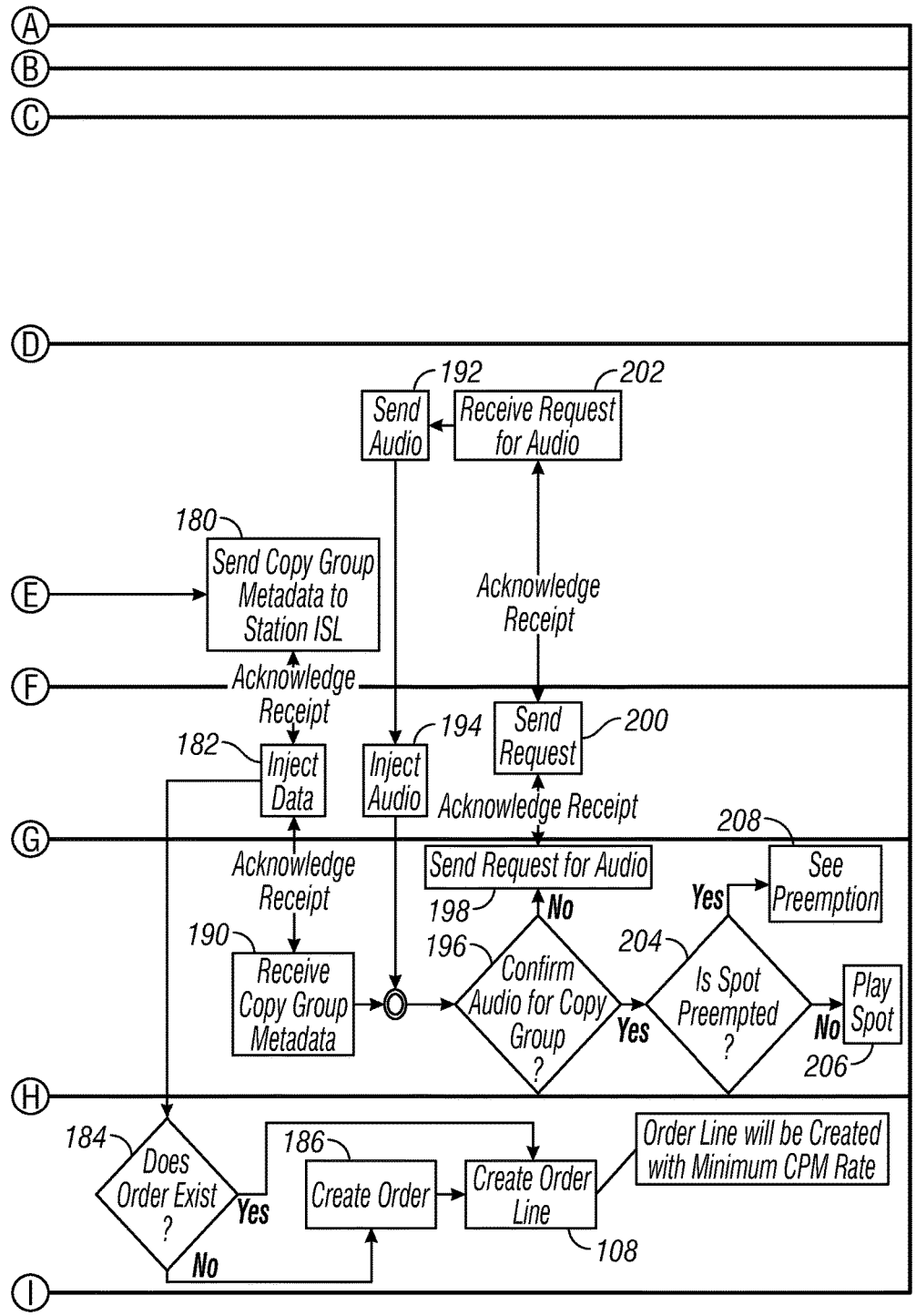

With reference to FIG. 6, shown is an embodiment of a method 160 of providing spot instructions with respect to system 10 and method 20. Note that method 160 corresponds to blocks 36-52 in method 20 shown in FIG. 2. Method 160 starts from the pre-condition that partner has received the final preliminary log file from local market transaction delivery system 18 at partner web interface 12, block 162. Local market transaction delivery systems 18 may send out non-final version of the preliminary log earlier than the midnight deadline for the final preliminary log. However, the preliminary log sent out at 12:00 AM one day prior to day of play, and referred to above, e.g., in FIGS. 2A-2B, is a final preliminary log file. In other words, the local station cannot make any more changes to the preliminary log (until partners submit their avail claims and the claims are processed). The preliminary log is locked in a final format—the final preliminary log file.

Enterprise hub 14 will poll partner web interface 12 for an XML file with copy group metadata, as indicated at block 166. XML file is the file prepared by partner web interface 12 with partner's avails claims. The copy group metadata is the identifying metadata, e.g., partner ID, the industry and/or product code, for the avails claims. Examples of this metadata are shown in FIG. 2C. This metadata identifies the industry and/or product of each advertisement spot that will be submitted by partner for each of its claimed avails. Partner will send the XML file to enterprise hub 14 through partner web interface 12, as depicted at block 165. As shown, partner web interface 12 and enterprise hub 14 will acknowledge receipt of these messages. Enterprise hub 14 will validate the XML file with copy group metadata at the required field, as described at block 168. In other words, enterprise hub 14 verifies that XML file includes the metadata identifying the industry and/or product for each advertisement spot that will be submitted by partner for each of its claimed avails. If not validated, enterprise hub 14 will send a detailed error message to partner web interface 12, as indicated at block 170, and the process will repeat until there are no errors.

If validated, enterprise hub 14 will look for audio from partner. Partner will send audio to enterprise hub 14 through partner web interface 12, block 172. Enterprise hub 14 will confirm the received audio is for the copy group reference in the XML file, block 174. If not, enterprise hub 14 will send a request for the audio to partner web interface 12, as described at block 176. Partner web interface 12 will receive the audio request, block 178, and send the requested audio 172. This process will repeat until audio for the copy group is sent and confirmed. If confirmed, enterprise hub will send copy group metadata to the appropriate station's ISL 16, as illustrated at block 180.

With continued reference to FIG. 6, ISL 16 acknowledges receipt to enterprise hub 14 and injects the metadata into local market delivery system 18, as depicted at block 182. This process is preferably performed simultaneously into both traffic and billing system and the audio delivery system of local market delivery system 18. In this manner, the spot audio playlist is synchronized between these two local market delivery systems 18. This synchronization better ties together the traffic and billing system with the audio delivery system, enabling better cooperation between the two. In embodiments described herein, the audio delivery system (e.g., NexGen Digital™) contains everything—e.g., the logs, advertising spots, music, etc., and importantly, the main playlist for the station) while traffic and billing system (e.g., VIERO RMS™) only contains the advertising spots and a playlist for the spots (based on the claimed avails and local market ads, if any). Audio delivery system and traffic and billing system are constantly re-synching their playlists to ensure that everything is played when it is scheduled to be played. For example, if traffic and billing system spot playlist indicates that a spot should play at 7:00 AM and scheduled audio on main playlist would have a break at 6:58 AM, audio delivery system will insert some audio, e.g., a 2 minute song, etc., to re-sync with spot playlist and play spot at 7:00 AM.

This synchronization feature also enables intuitive shuffling of spots because of changes to the main audio playlist or if a spot gets bumped from its assigned time e.g., because of unexpected change to audio playlist. Specifically, if a spot is moved from its assigned time, or if a break is shortened, local market transaction delivery system 18 will shuffle spots around to attempt to play all the spots. When shuffling spots, local market transaction delivery system 18 applies various rules and/or contract requirements to avoid playing spots in a conflicting manner. For example, local market transaction delivery system 18 will avoid playing spots from same industry back-to-back or within a certain time of each other. Also, certain rules or contract requirements may dictate that certain spots be played within a certain hour of day, during a certain radio program, or adjacent a certain type of song. The local market transaction delivery system 18 applies these rules and requirements so that re-scheduled spots do not violate. If a spot is in violation, it will automatically shuffle the spots until there are no violations or the violations are minimized. It will also apply these rules and requirements to spots when there is some other change in programming that would not necessitate the moving of the spots, but would change, for example, the type of music or programming played adjacent to the spot. If changing the programming would cause a scheduled spot to be in violation of a rule or requirement, local market delivery system 18 will automatically shuffle the spot to a different time.

With continued reference to FIG. 6, in the example shown, ISL 16 injects the metadata into VIERO RMS™ and NexGen Digital™ systems. The VIERO RMS™ system determines whether an order exists for the spot, as shown at block 184. An order would already exist, for example, if the spot instructions were for a preemption spot. If no order exists, the VIERO RMS™ system creates the order, as indicated at block 186. Once the order is created, the VIERO RMS™ system creates the order line, as depicted at block 188.

Meanwhile, the NexGen Digital™ system will receive the copy group metadata, as illustrated at block 190 and await audio. Enterprise hub 14 will send audio to the station's ISL 16, as indicated at block 192, which will inject the audio into local market delivery system 18 (e.g., NexGen Digital™), as shown at block 194. The local market delivery system 18 will confirm the audio is for the copy group by examining the copy group metadata, as illustrated at block 196. If not, local market delivery system 18 will send a request for the correct audio to its ISL 16, as shown at block 198, which will forward the request to enterprise hub 14, as described at block 200. Enterprise hub 14 will receive the request for audio, block 202, and send 192 the appropriate audio, repeating the process until local market delivery system 18 confirms correct. Once local market delivery system 18 confirms the audio is correct, local market delivery system 18 determines if spot is preempted, as depicted at block 204. If not preempted, local market delivery system 18 (e.g., NexGen Digital™) plays spot, block 206. If preempted, local market delivery system 18 does not play spot, but looks for preemption spot (see FIG. 12), as illustrated at block 208.

Figure 7:
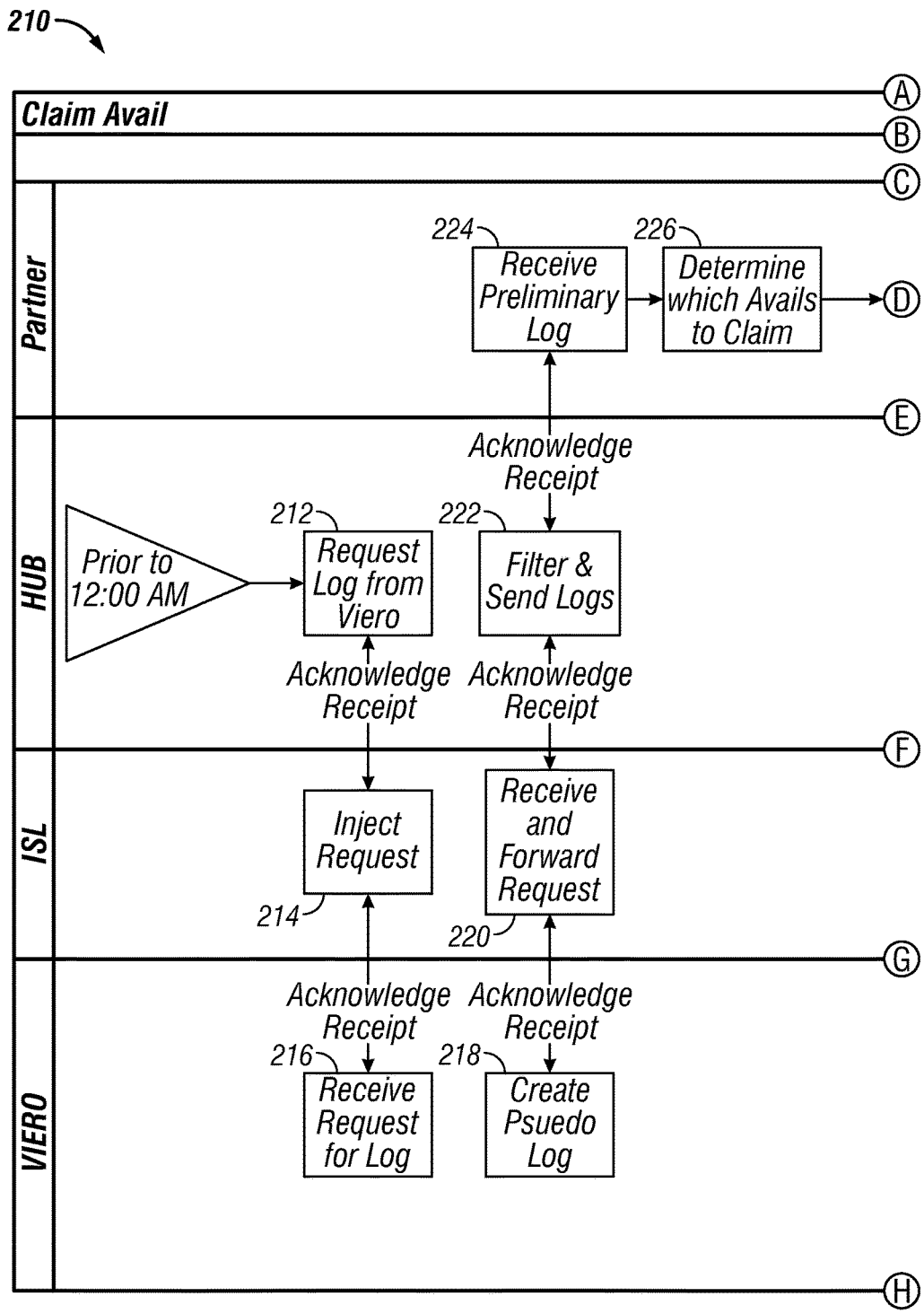
FIG. 7 illustrates a flow diagram of a method of claiming avails in an embodiment of a system for integrated, automated inventory management and advertisement delivery, in accordance with an embodiment.
Figure 7:
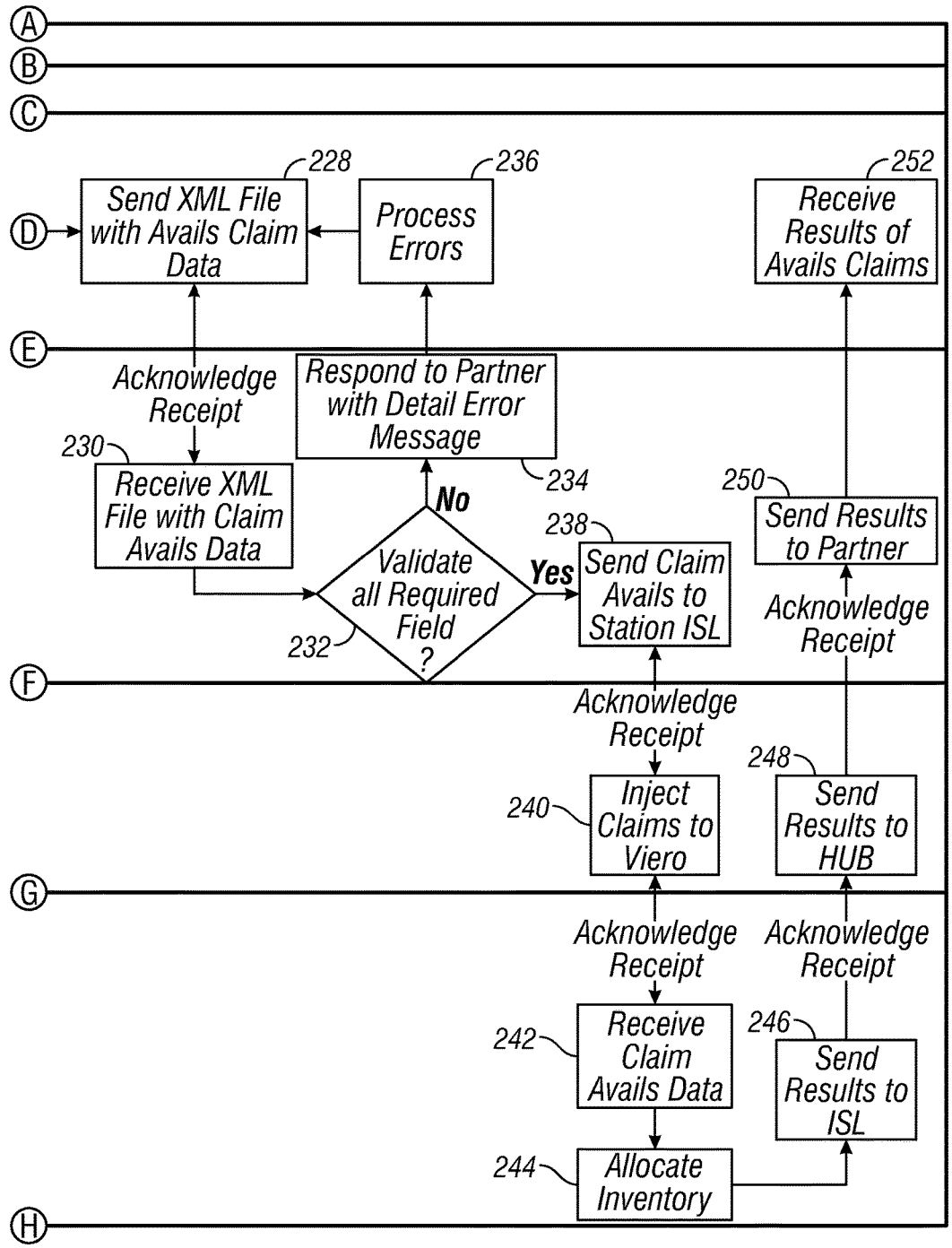

With reference now to FIG. 7, shown is an embodiment of method 210 claiming avails in system 10 and method 20. Method 210 corresponds to the operations and processing steps depicted in blocks 22-34 of method 10 of FIG. 2. The enterprise hub 14 can request a log form local market delivery system 18, as indicated at block 212. This action may be performed on a regular basis, e.g., on a daily, hourly, etc., or in response to a request for avail information from a partner web interface 12. Although the request is shown being transmitted to one station (i.e., one local market), the enterprise hub 14 may transmit a request to all stations served by system 10 or of interest to a partner. The station's ISL 16 receives and injects the request, as shown block 214, and acknowledges receipt to enterprise hub 14. Local market delivery system 18, in this example VIERO RMS™ (e.g., see block 33 of FIG. 2A) receives the request for the log, as depicted at block 216, acknowledges receipt to ISL 16, and creates a pseudo log, as described at block 218, which it transmits to ISL 16. A pseudo log is a non-final preliminary log (see above), a framework. If local market transaction delivery system 18 is down, a pseudo log may be an estimate of avails. ISL 16 receives and forwards pseudo log, as illustrated at block 220, and acknowledges receipt. Enterprise hub 14 typically receives pseudo logs from multiple stations. Enterprise hub 14 filters (e.g., removes metadata that identifies advertisers and/or other partners in existing spots in log) and sends the pseudo log to partner web interface 12, as described at block 222.

The partner web interface 12 receives and displays the filtered preliminary log (typically receives logs from plurality of stations), as indicated at block 224. Partner determines which avails to claim, selecting displaced avails on display of partner web interface 12, as illustrated at block 226. Partner web interface 12 generates and sends an XML file (e.g., uploaded log—see FIG. 2C) with avails claim data based on the partner selections, as shown at block 228. The XML file may contain avails claims for one station or multiple stations. Enterprise hub 14 receives the XML file with avails claims data, as described at block 230, acknowledges receipt, and attempts to validate all required fields (e.g., product and/or industry code), as indicated at block 232. If the required fields are not validated, enterprise hub 14 responds to partner web interface 12 with a detailed error message, as illustrated at block 234. Partner web interface 12 processes the error message, as described at block 236, then re-generates and sends 228 the XML file. If necessary, partner web interface 12 prompts partner user for more information.

With continued reference to FIG. 7, when the required fields are validated, enterprise hub 12 sends the avails claims to the appropriate station(s) ISL 16, as illustrated at block 238. The ISL 16 acknowledges receipt and injects the claims into the local market delivery system 18 (in this example VIERO RMS™), as depicted at block 240. Local market delivery system 18 receives the avails claims data, as shown at block 242, acknowledges receipt, and allocates its inventory per the received claims, as describe at block 244. After allocating inventory, local market delivery system 18 sends results of its allocation to the ISL 16, as illustrated at block 246. ISL 16 acknowledges receipt and forwards the results to partner web interface 12, as described at block 250. Partner web interface 12 receives and displays the results, as indicated at block 252, enabling partner to verify that all of its claims were fulfilled or to determine which avails claims were not filled.

Figure 8:
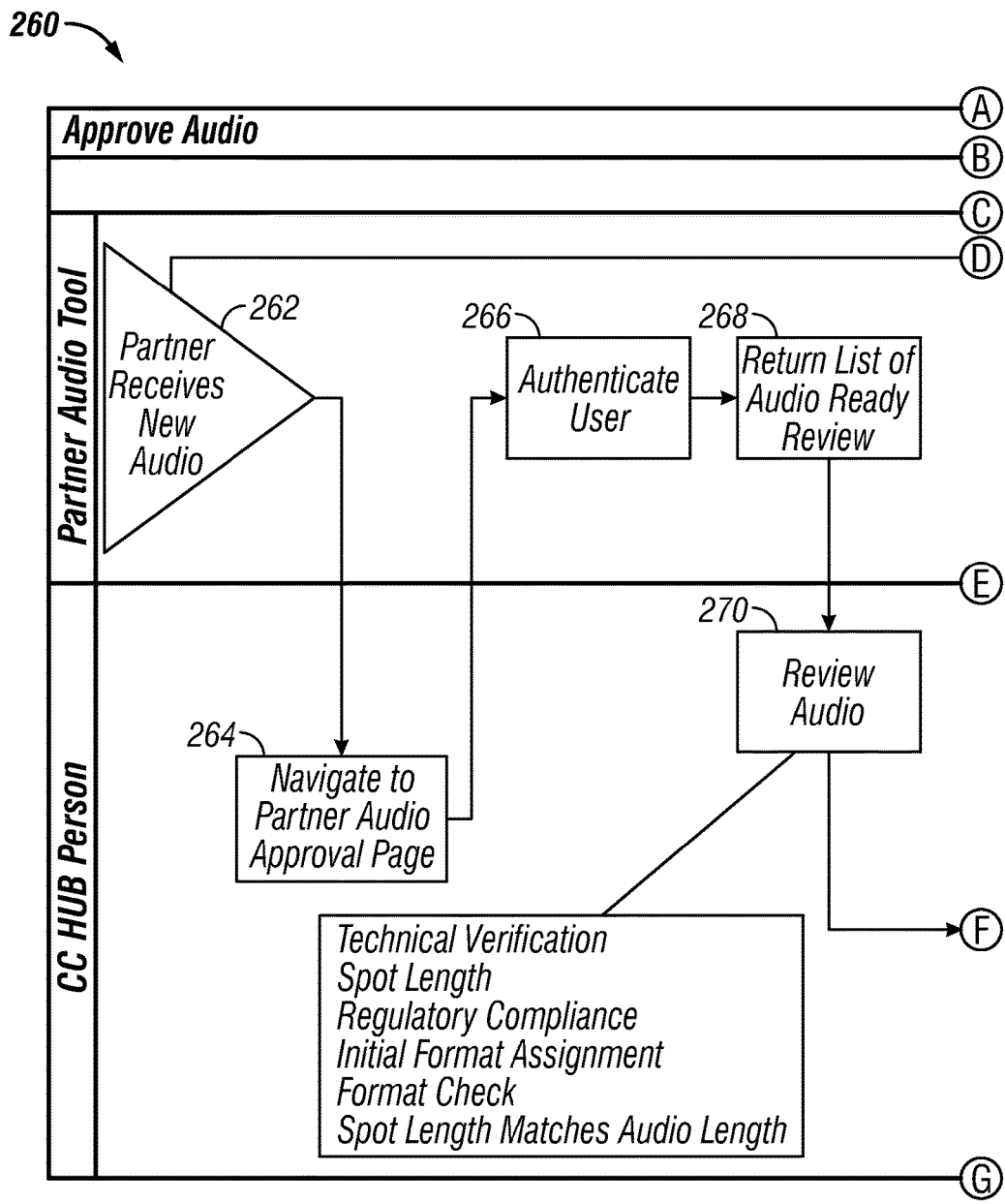
FIG. 8 illustrates a flow diagram of a method of approving/rejecting audio in an embodiment of a system for integrated, automated inventory management and advertisement delivery, in accordance with an embodiment.
Figure 8:
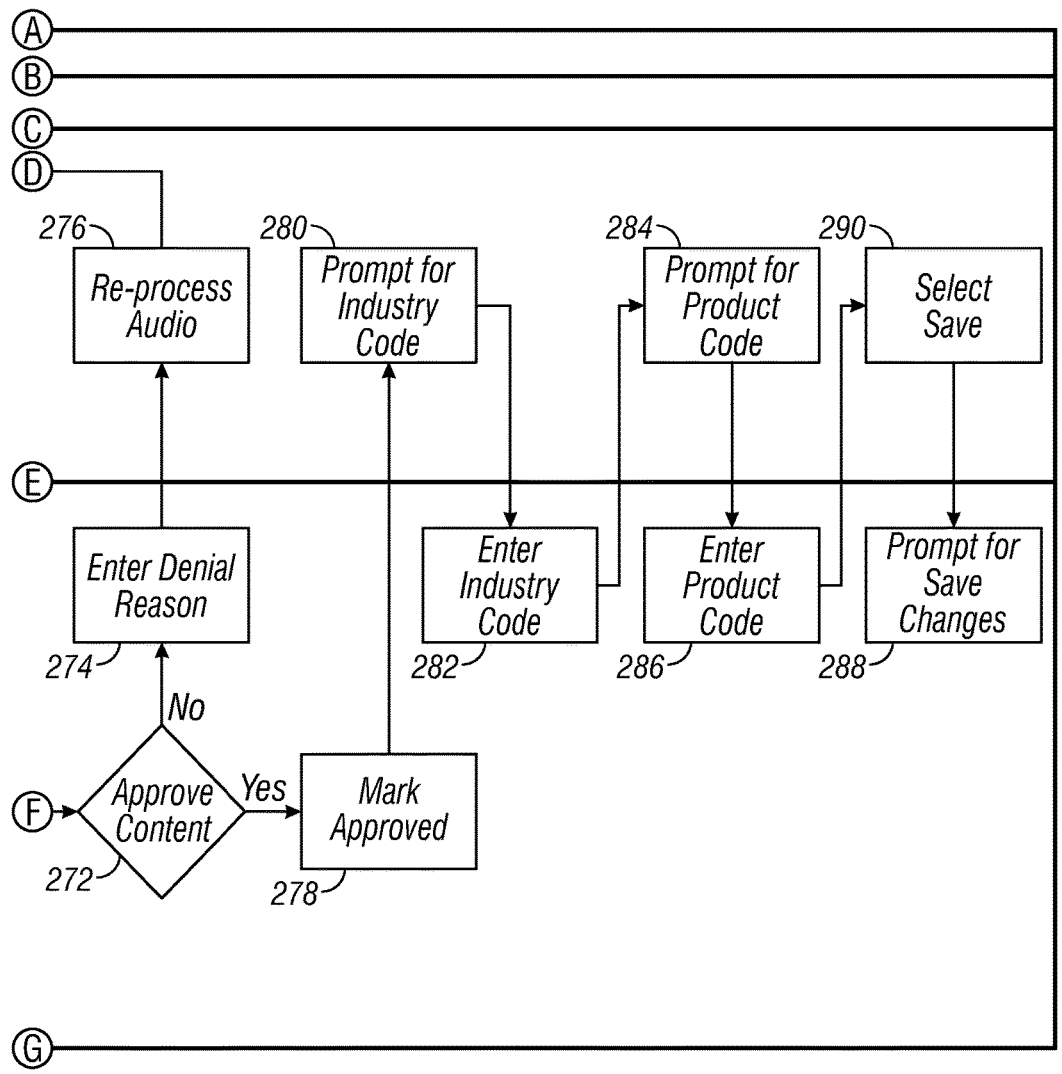

With reference now to FIG. 8, illustrated is an embodiment of method 260 with respect to approving/rejecting audio (e.g., an advertisement, other audio content or audio data, etc.) in the context of system 10 and/or method 20. Note that method 260 generally corresponds to the processing and operational steps indicated in blocks 48-52 of method 20 as depicted in FIG. 2. In general, most stations require approval of audio before it can be utilized in a spot. Two components that can interact in the embodiment of method 260 as shown include a partner audio tool or a management console, which may constitute a component of the partner web interface 12, and an enterprise hub 14 user, although the latter may be replaced by software programmed to perform as indicated by the illustrated steps. The partner can receive new audio, as indicated at block 262. After the enterprise hub 14 receives new audio or notice of new audio, the enterprise hub user can navigate to the partner audio tool audio approval page, as shown at block 264. The partner audio tool authenticates the enterprise hub user, as illustrated at block 266, and returns a list of new audio ready for review, as described generally at block 268. The enterprise hub user can review the audio (e.g., listens to audio), as depicted at block 270. The enterprise hub user can determine whether or not to approve or reject the audio content, as described at block 272. If not approved, enterprise hub user enters a denial reason, as shown at block 274.

Partner audio tool re-processes audio based on denial reason, receiving partner user input as necessary and re-submits audio to list of audio ready for review, as illustrated at block 276. If audio is approved, enterprise hub user marks audio approved, as described at block 278. After approved, partner audio tool prompts for industry code, as indicated at block 280, which is entered by enterprise hub user, as illustrated at block 282. Audio tool prompts for product code, as shown at block 284, which is entered by enterprise hub user, as described at block 286. Enterprise hub prompts user to save changes, as depicted at block 288, and user selects save option, as indicated at block 290, causing partner audio tool to save audio with approval, industry code and product code. Subsequently, audio can be used for spots in system 10. Enterprise hub user repeats above for every pending advertisement.

Figure 9:
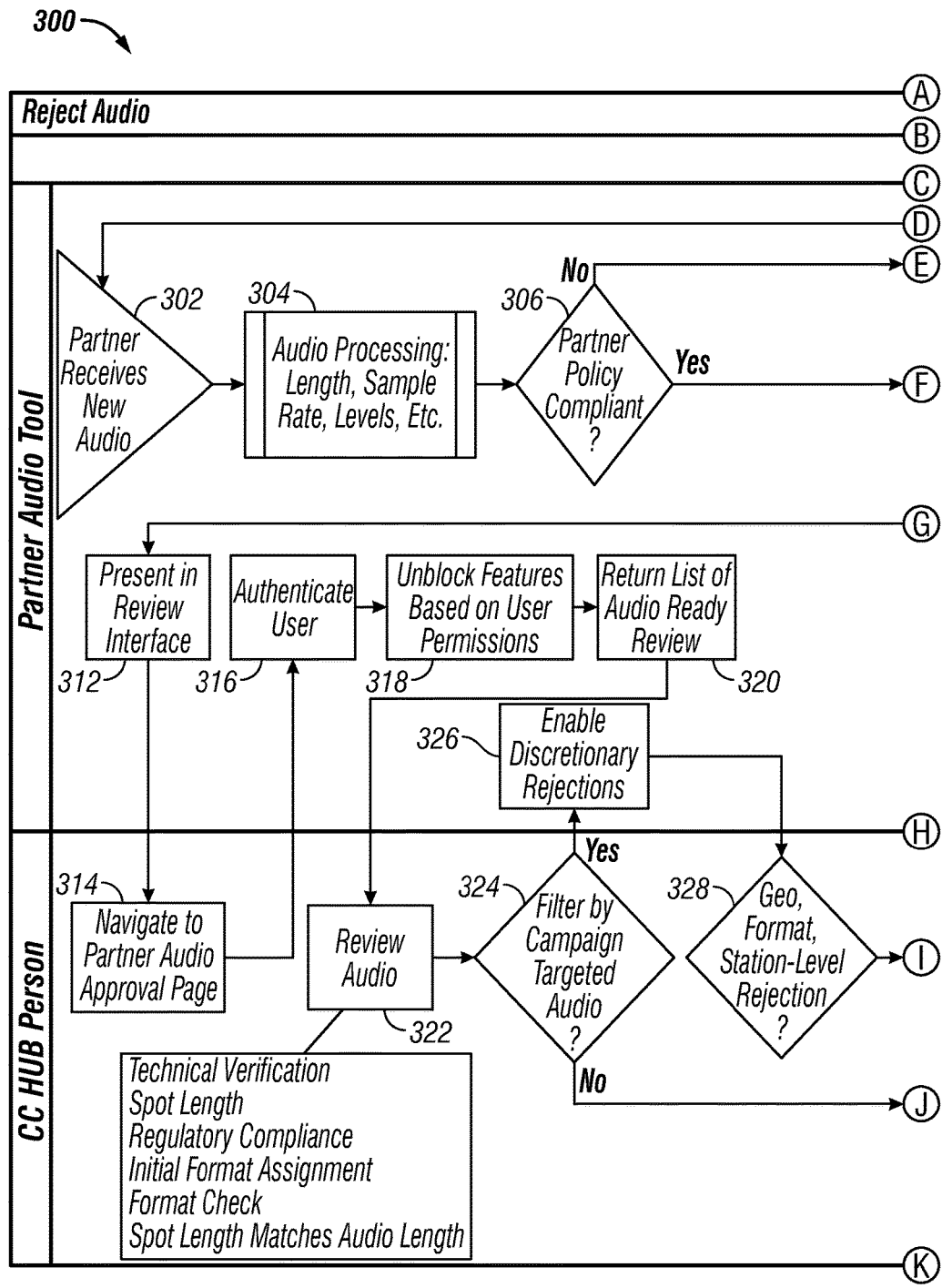
FIG. 9 illustrates a flow diagram of a method of approving/rejecting audio, in accordance with an embodiment.
Figure 9:
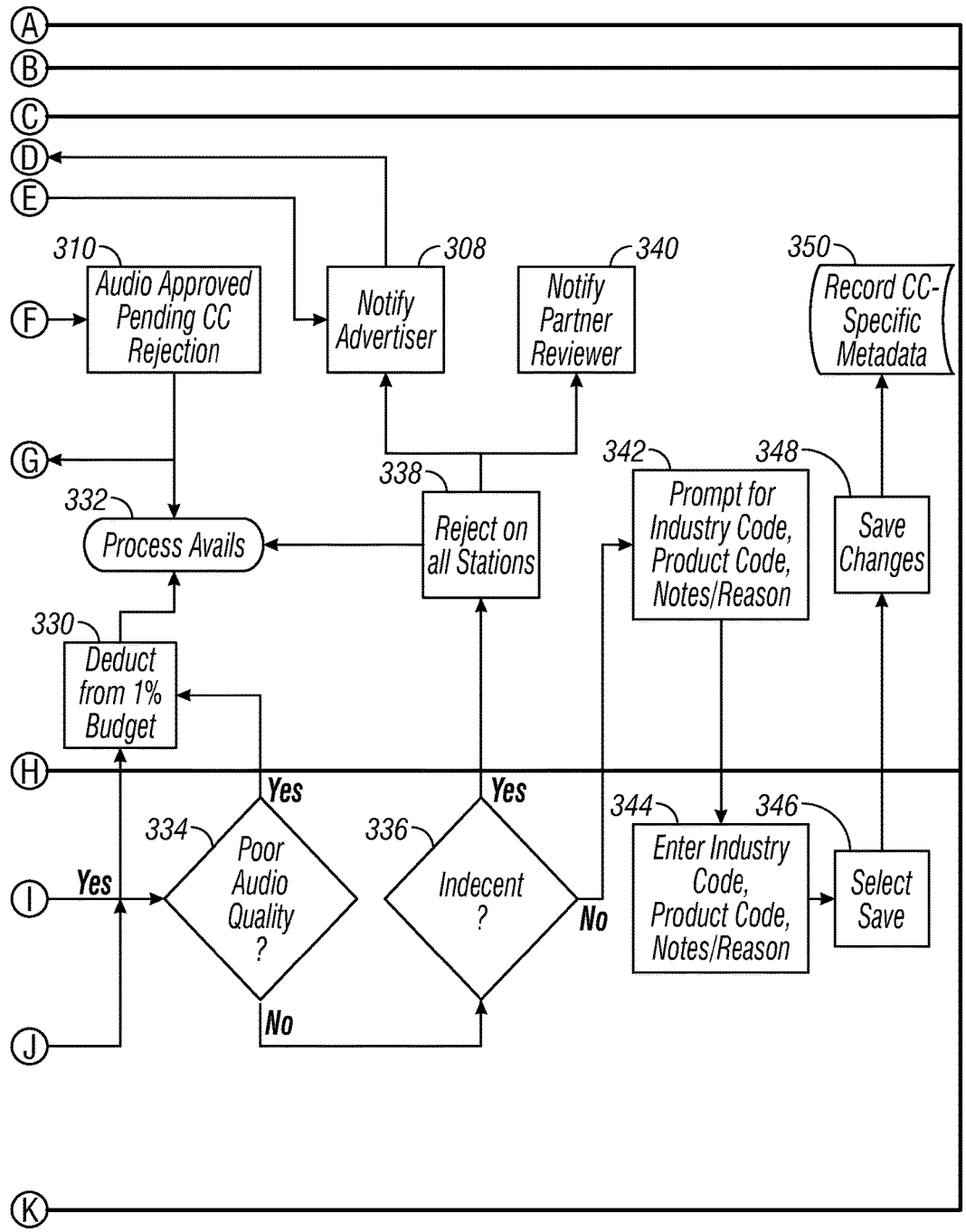

With reference now to FIG. 9, another embodiment of method 300 of approving/rejecting audio in system 10 and method 20 is illustrated. As above, partner receives new audio, as shown at block 302. The partner audio tool can process audio, as described at block 304. The partner determines whether audio is compliant with partner policies, local market standards, system 10 standards, FCC and other applicable regulations, as indicated at block 306. If not compliant, partner notifies advertiser, as depicted at block 308, who may revise and re-submit audio. If audio is compliant, audio can be approved at the partner level pending approval via the enterprise hub, as shown at block 310. Audio is presented in audio review interface of partner audio tool, as depicted at block 312.

The enterprise hub user navigates to partner audio tool review interface, as described at block 314. The partner audio tool authenticates the enterprise hub user, as illustrated at block 316, and unlocks features based on user permission, as shown at block 318. The partner audio tool returns a list of audio ready for review, as depicted at block 320. The enterprise hub user reviews the audio, as indicated at block 322. Using the partner audio tool, the enterprise hub user can determine if audio is filtered by campaign targeted audio, as illustrated at block 324. Partners may submit ad campaigns that provide repeating spots over a period of time on a regular basis. Such campaign target audio may be filtered out so that only non-campaign targeted audio is reviewed in partner audio tool. If yes, enterprise hub user enables discretionary rejections in partner audio tool, as shown at block 326, and asks if geographical, format or station level discretionary rejection applies, as described at block 328. If such a discretionary rejection applies, enterprise hub user uses partner web interface 12 to deduct from 1% budget, as indicated at block 330. In other words, if audio needs to be corrected (it was rejected), enterprise hub charges partner an additional 1%. Partner web interface processes avails to indicate which avails have rejected audio, as illustrated at block 332.

If not filtered by campaign target audio or if no geographical, format or station level discretionary rejection applies, enterprise hub user determines if audio has poor quality, as described at block 334. If audio has poor audio quality, enterprise hub user uses partner web interface 12 to deduct from 1% budget. Partner web interface processes avails, as shown at block 330. If not poor audio quality, enterprise hub user determines if audio is indecent, as depicted at block 336. If indecent, partner audio tool rejects audio for all stations, as illustrated at block 338, notifies advertiser, block 308, notifies partner reviewer, as indicated at block 340, and partner web interfaces proceeds to process avails 332. If not indecent, audio is approved, and partner audio tool prompts for industry code, product code, notes/reason, etc., as depicted at block 342, which are entered by enterprise hub user, as shown at block 344. Enterprise hub user selects save option, as described at block 346, enterprise audio tool saves changes, block 348, and records system 10 specific metadata, as illustrated at block 350. Enterprise hub user repeats above for every pending advertisement.

Figure 10:
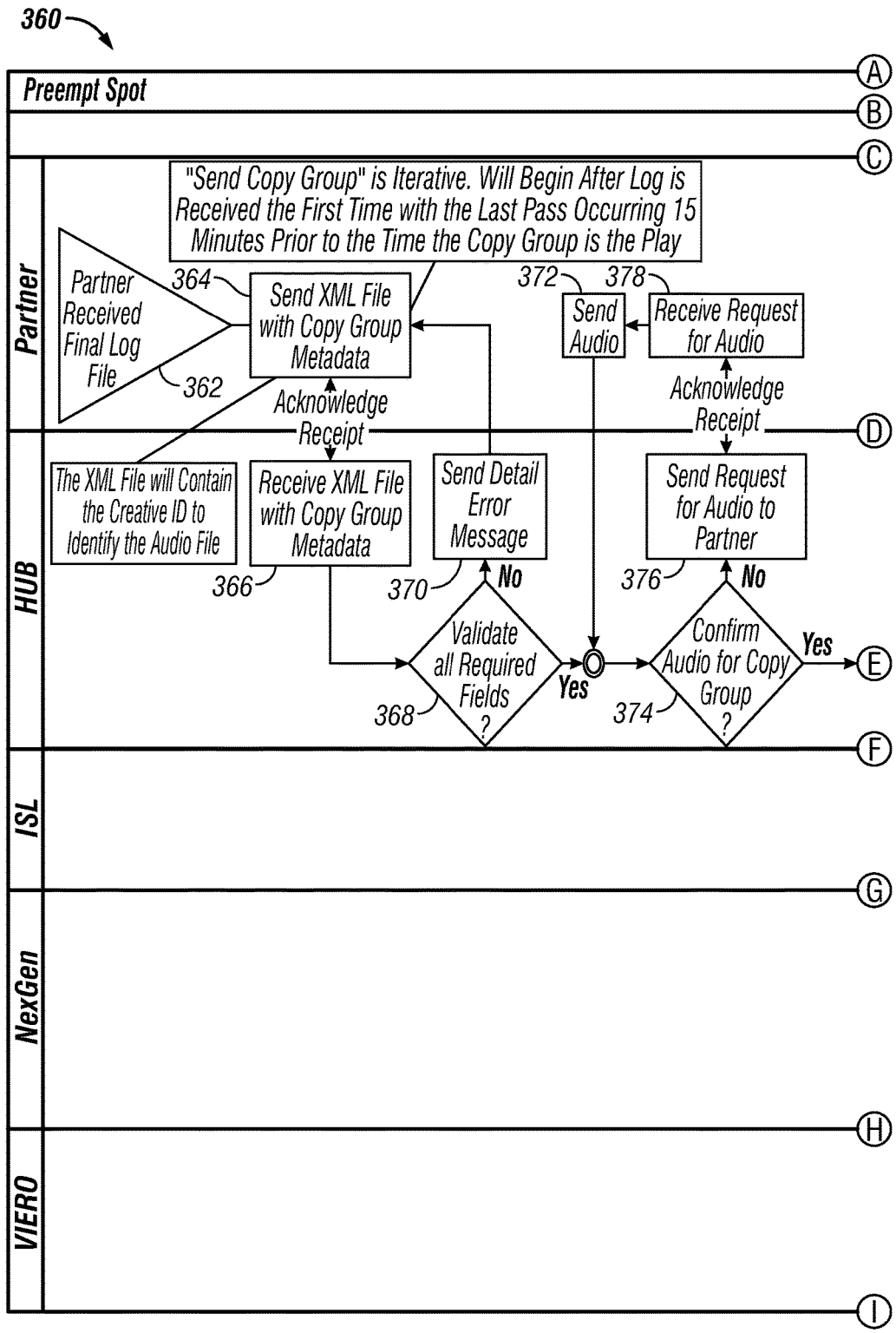
FIG. 10 illustrates a flow diagram of an embodiment of a method of preempting a spot in an embodiment of a system for integrated, automated inventory management and advertisement delivery, in accordance with an embodiment.
Figure 10:
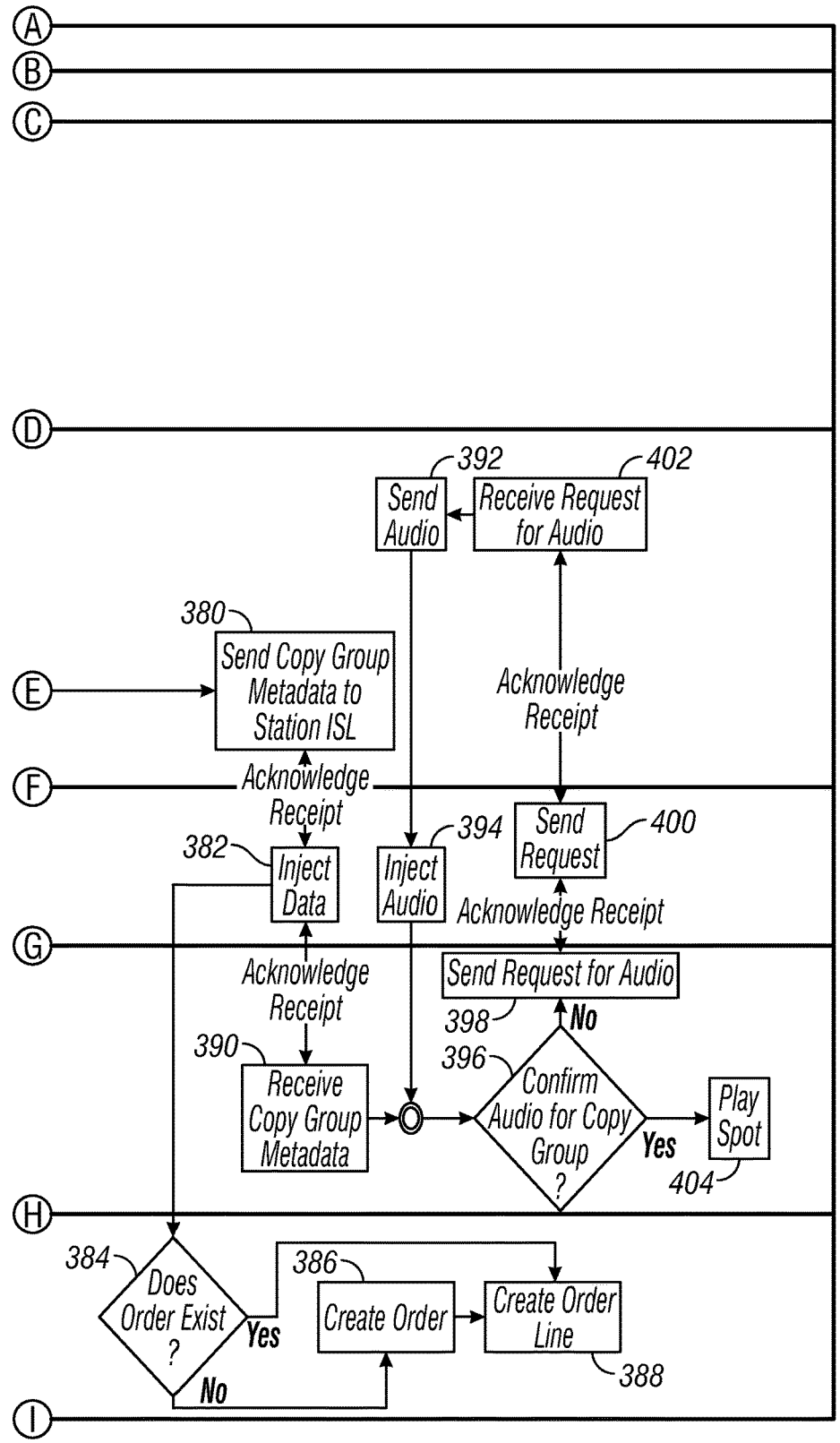

With reference now to FIG. 10, shown is an embodiment of method 360 of preempting a spot in system 10 and method 20. Partner web interface 12 receives the log file, as indicated at block 362. Partner web interface 12 sends the XML file with copy group metadata, as shown at block 364. As shown in FIG. 10, this is iterative and will being after log is received first time and continue until shortly before play time for copy group (e.g., 15 minutes prior to play). Enterprise hub 14 receives the XML file with copy group metadata, as illustrated at block 366. Enterprise hub 14 validates all required fields, as depicted at block 368. If not validated, enterprise hub 14 sends a detailed error message, as indicated at block 370. If validated, enterprise hub 14 will look for audio from partner. Partner will send audio to enterprise hub 14 through partner web interface 12, as illustrated at block 372. Enterprise hub 14 will confirm the received audio is for the copy group referenced in the XML file, as indicated t block 374. If not, enterprise hub 14 will send a request for the audio to partner web interface 12, as shown at block 376. Partner web interface 12 will receive the audio request, as described at block 378, and send the requested audio 372. This process will repeat until audio for the copy group is sent and confirmed. If confirmed, enterprise hub will send copy group metadata to the appropriate station's ISL 16, as depicted at block 380.

ISL 16 acknowledges receipt to enterprise hub 14 and injects the metadata into local market delivery system 18, as indicated at block 382. In the example shown, ISL 16 injects the metadata into VIERO RMS™ and NexGen Digital™ systems. Local market delivery system 18 determines whether an order exists for the spot, as depicted at block 384. An order would already exist, for example, if the spot instructions were for a preemption spot. If no order exists, the VIERO RMS™ system creates the order, as illustrated at block 386. Once the order is created, the VIERO RMS™ system creates the order line, as described at block 388.

With continued reference to FIG. 10, the NexGen Digital™ system will receive the copy group metadata, as indicated at block 390 and await audio. Enterprise hub 14 will send audio to the station's ISL 16, as depicted at block 392, which will inject the audio into local market delivery system 18 (e.g., NexGen Digital™), as shown at block 394. The local market delivery system 18 will confirm the audio is for the copy group by examining the copy group metadata, as described at block 396. If not, local market delivery system 18 will send a request for the correct audio to its ISL 16, as illustrated at block 398, which will forward the request to enterprise hub 14, as depicted at block 400. Enterprise hub 14 will receive the request for audio, as indicate at block 402, and send 392 the appropriate audio, repeating the process until local market delivery system 18 confirms correct. Once local market delivery system 18 confirms the audio is correct, local market delivery system 18 (e.g., NexGen Digital™) plays spot, as shown at block 404.

Figure 11:
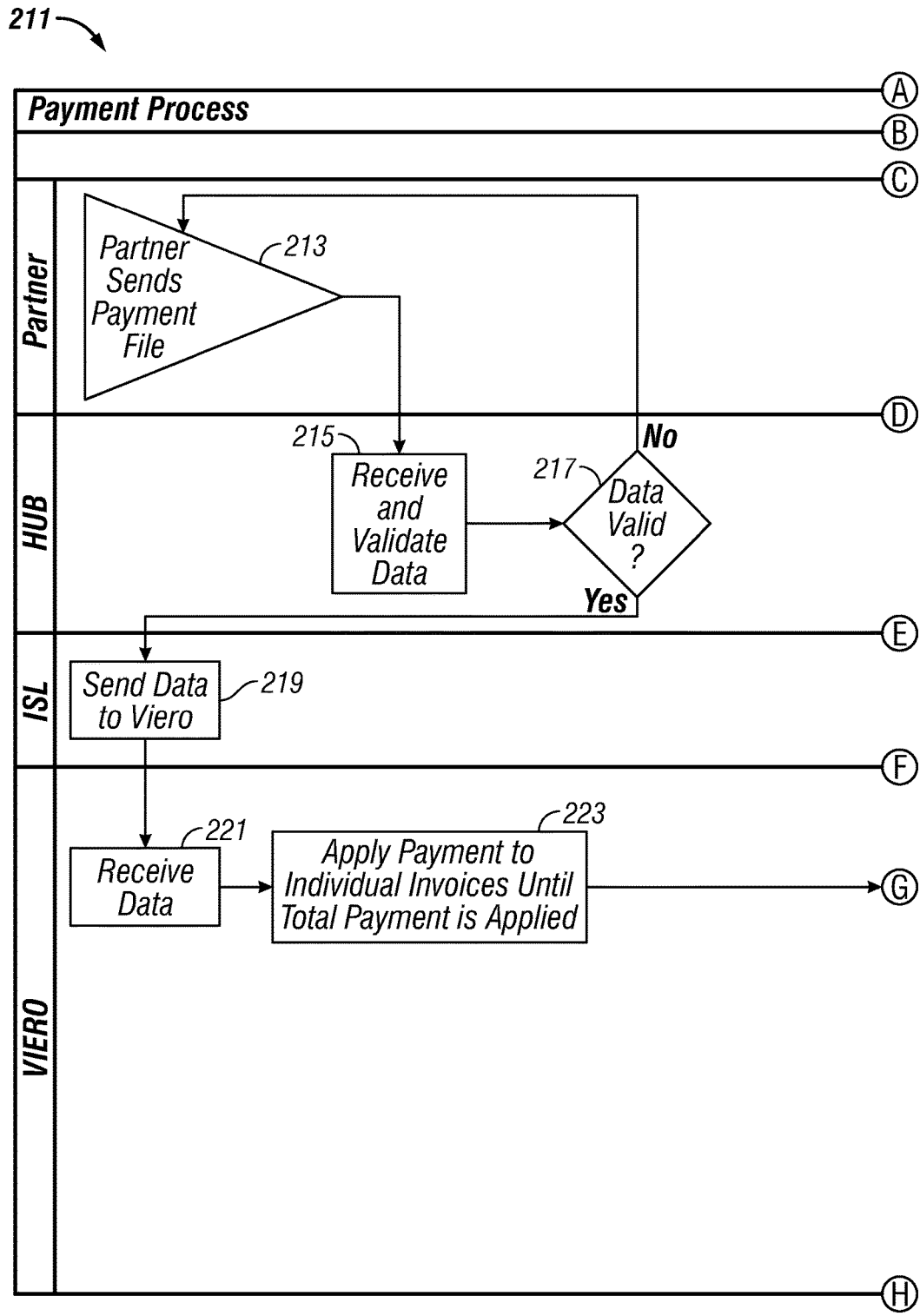
FIG. 11 illustrates a flow diagram illustrating a method of processing payments in an embodiment of a system for integrated, automated inventory management and advertisement delivery, in accordance with an embodiment.
Figure 11:
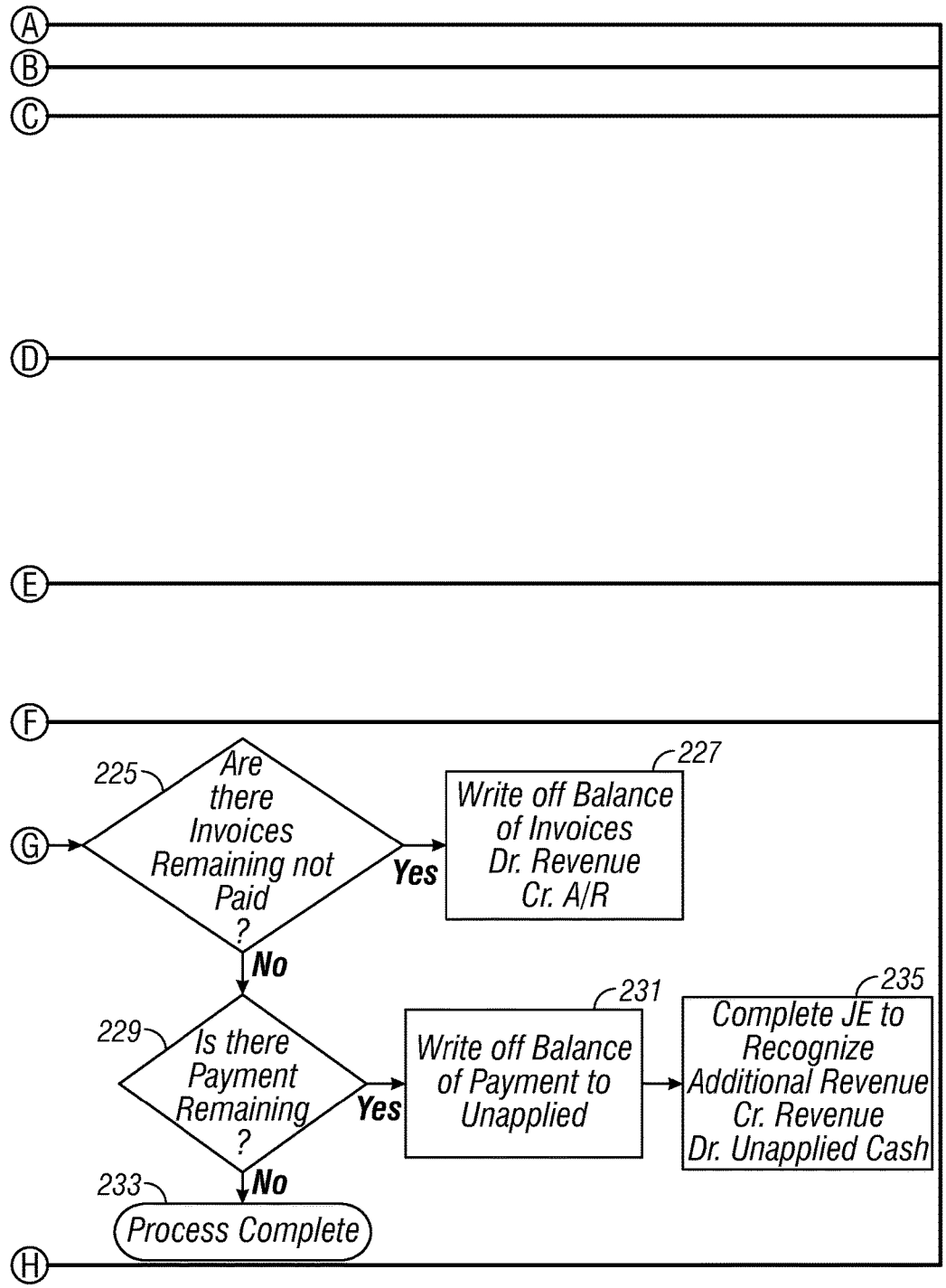

With reference now to FIG. 11, a method 211 is shown, which can also be embodiment as a part of method 210 for processing payments with respect to system 10 and method 20. When owing money to a station, a partner sends a payment file through partner a web interface, as indicated at block 213. Thereafter, as illustrated at block 215, the enterprise hub 14 receives and validates payment file. If not valid, as indicated at block 217, an error message is sent to partner web interface 12, which can re-submit payment file. If valid, payment file is sent to ISL 16, as indicated at block 219. ISL sends payment file to local market delivery system 18. In the example shown, payment file is sent to VIERO RMS™. The local market delivery system 18 receives the payment file, as indicated at block 221, and applies the payment to individual invoices until the total payment included in payment file is applied, as depicted at block 223. The local market delivery system 18 determines if there are any remaining invoices not paid, as shown at block 225. If yes, the local market delivery system 18 may write off balance of invoices, as depicted at block 227. If no invoices remaining unpaid, the local market delivery system 18 determines if there is any payment remaining in payment file, as described at block 229. If no, the process is complete, as depicted at block 233. If yes, the balance of payment is written off to unapplied and additional revenue is recognized as indicated at blocks 231 and 235.

Figure 12:
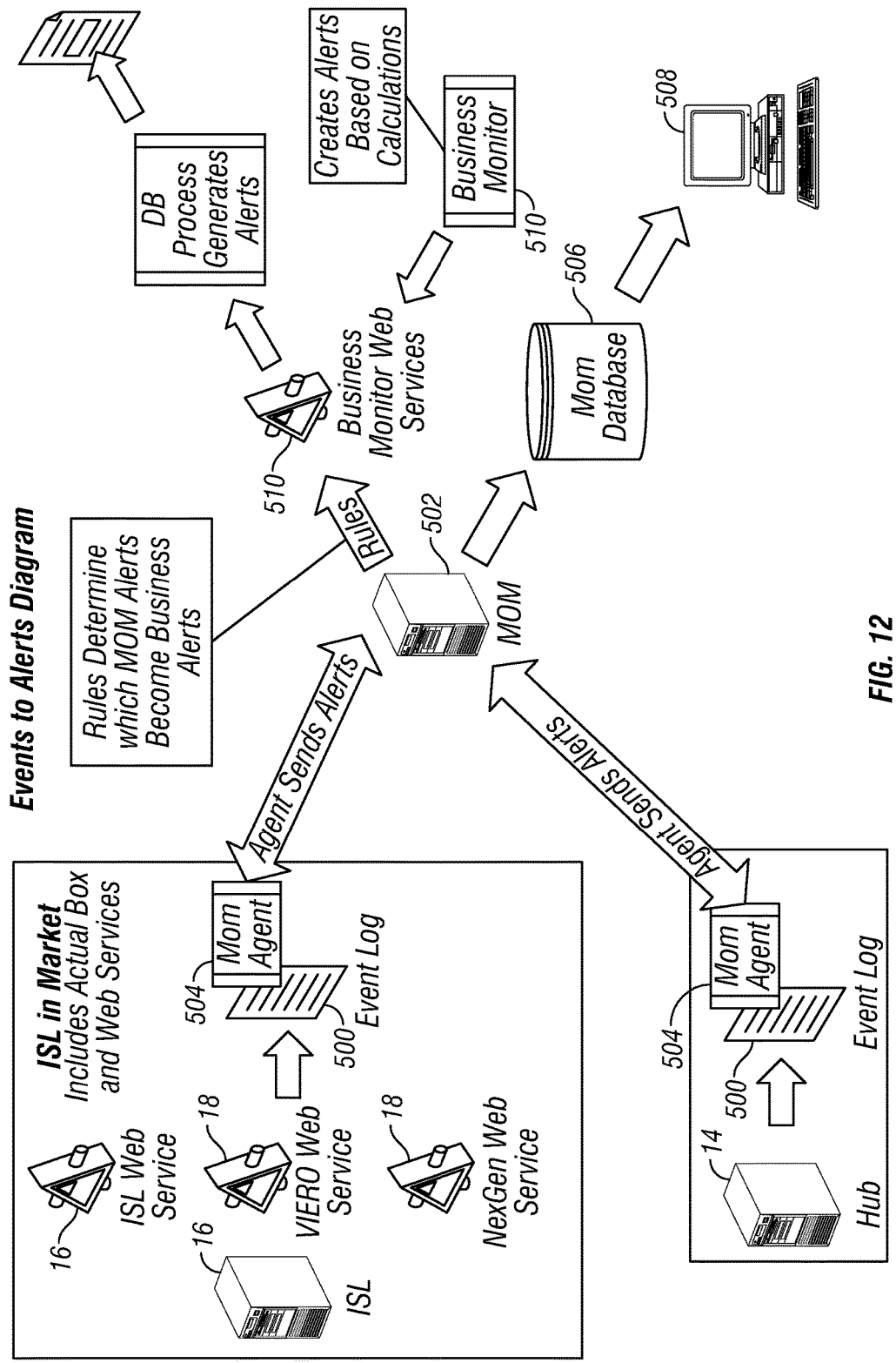
FIG. 12 illustrates a diagram depicting events to alerts in an embodiment of a system for integrated, automated inventory management and advertisement delivery.

With reference now to FIG. 12, shown is a diagram illustrating the correspondence of events to alerts in an embodiment of system 10 and method 20. The diagram shows various components of system 10. These components, including enterprise hub 14, ISL 16, and local market delivery system 18 create ongoing logs 500 of events. An event monitoring system 502, e.g., a Microsoft Operation Manager™ or "MOM", includes agents 504 installed at the system 10 components monitoring the event logs 500. If a recorded event in the event log 500 matches a specified criteria, event monitoring system 502 (e.g., MOM) agents 504 sends an alert to event monitoring system 502. Event monitoring system 502 stores the alerts in a event monitoring system database 506 that can be accessed by users via an event monitoring system operator's console 508. Event monitoring system 502 applies rules to the alerts to determine if the alerts should become business alerts and passed onto a business monitor 510. For example, if audio is not delivered on time by partner or if XML metadata fails to meet requirements, this might meet a business rule for triggering a business alert. Other alerts may be system alerts such as communication is cut-off from partner web interface 12 server. If the alerts are passed on as business alerts, business monitor 510 processes the alerts and posts the business alerts on a business monitor webpage. Business monitor 510 creates web page alerts based on calculations— e.g., calculation that alert is of sufficient criticality, etc. System 10 users can monitor the business monitor webpage to become aware of new business alerts. In an embodiment, a service bureau (see above) monitors and receives business alerts posted on business monitor web page.

Figure 13:
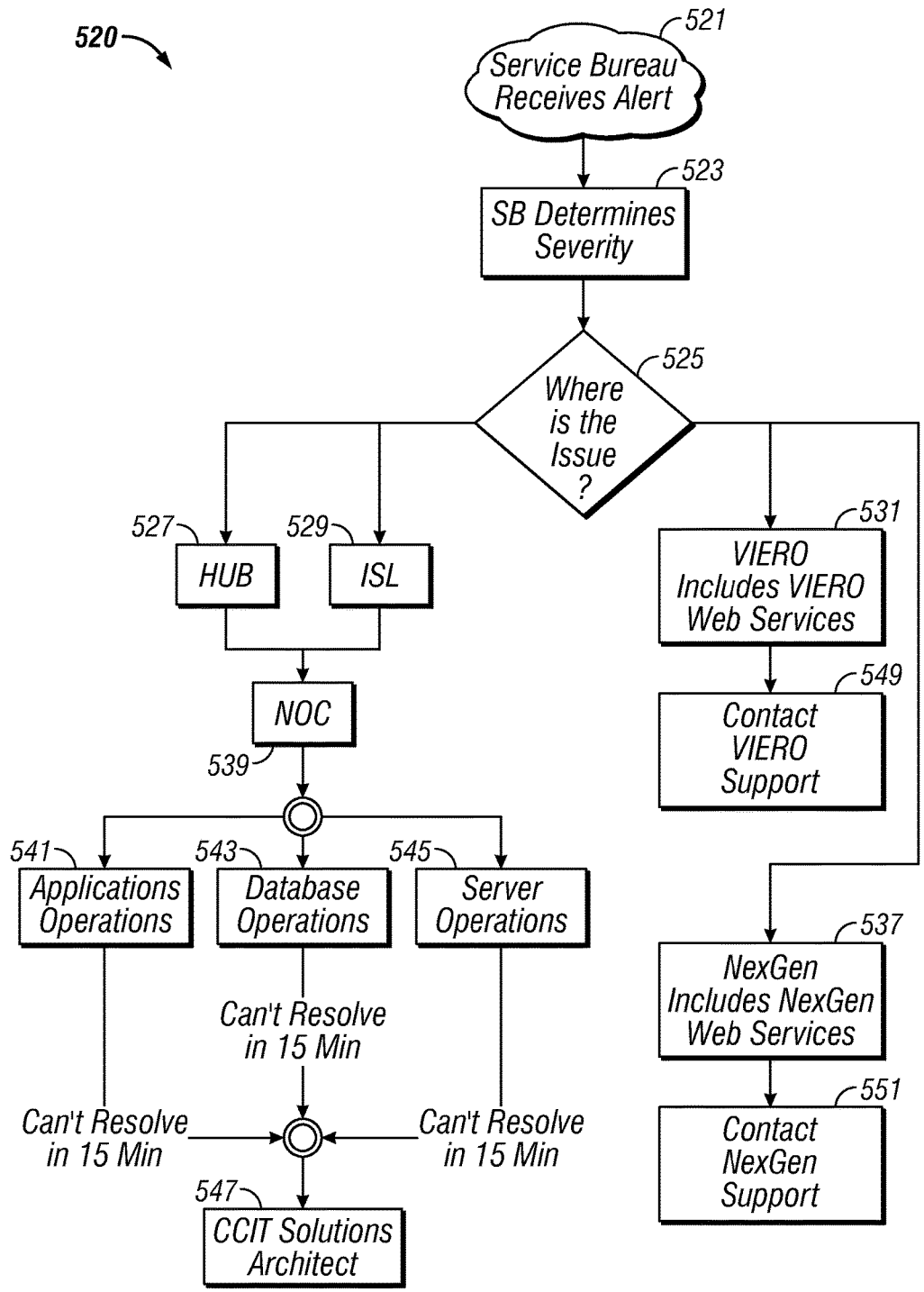
FIG. 13 illustrate a flow diagram of a method of processing alerts in an embodiment of a system for integrated, automated inventory management and advertisement delivery, in accordance with an embodiment.

With reference now to FIG. 13, shown is a diagram illustrating an embodiment of method 520 for processing alerts in an embodiment of system 10 and method 20. As indicated at block 521, the service bureau receives an alert. Next, as illustrated at block 523, the service bureau determines the severity of the alert and then, as depicted at block 525, identifies where the problem addressed by the alert is located. If the problem is located at the enterprise hub 14 or an ISL 16, as indicated respectively at blocks 527 and 529, the service bureau contacts a network operations center (NOC), as shown at block 539. The NOC determines if the problem is related to application operations, database operations, or server operations as respectively described at blocks 541, 543, and 545, and then attempts to resolve the problem. If the problem cannot be resolved within a certain period of time (e.g., 15 minutes), the problem is passed onto a system architect, as indicated at block 547. If the problem is located at a local market delivery system 18, the service bureau contacts the appropriate support department as indicated respectively at blocks 531, 549, 537, and 551. If, for example, the problem is located at VIERO RMS™ system, as indicated at block 531, the service bureau contacts VIERO RMS™ support, as illustrated at block 549. If, for example, the problem is located at the NEXGEN DIGITAL™ system, as depicted at block 537, then the service bureau contacts NEXGEN DIGITAL™ support, as illustrated at block 551.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An audio content delivery method for a distributed radio network, the method comprising:

requesting, through a plurality of radio network service gateways associated with the distributed radio network, a scheduling of one or more portions of audio content within assigned audio content time slots, the radio network service gateways comprising: a local market audio content delivery system, a centralized hub injecting at least a portion of the audio content into the local market audio content delivery system and a partner system to send one or more portions of the audio content to the centralized hub through a partner system web interface;

aggregating, in an aggregation layer within the centralized hub, communications including the one or more portions of audio content and audio content schedules, including at least audio content logs, between coupled ones of the local market audio content delivery systems and the partner system;

coordinating one or more partner system audio content placement transactions within the distributed radio network through communications between the plurality of network service gateways in response to a partner request through the partner system web interface to the plurality of radio network service gateways;

wherein the coordinating one or more partner system audio content placement transactions with the distributed radio network includes providing access to the one or more partner systems for claiming at least one audio content time slot from a group of previously assigned partner audio content time slots included in a preliminary audio content log, wherein the preliminary audio content log comprises an XML file with metadata and partner IDs representing the previously assigned partner audio content time slots, the preliminary audio content log reflecting a copy of a local audio log that represents a local radio station's audio play schedule; and wherein the coordinating one or more partner system audio content time slot placement transactions with the distributed radio network further includes transforming both the preliminary audio content log and the local audio content log by automatically releasing one or more of the previously assigned partner audio content time slots to a local market audio content delivery system to replace the previously assigned partner audio content time slots with local audio content time slots via the distributed radio network if the previously assigned partner audio content time slots are unclaimed by the one or more partner systems just prior to audio content air time.

2. The method of claim 1, wherein the distributed radio network verifies in a near real time fashion and without manual intervention whether the previously assigned partner audio content or the local audio content actually aired from the local audio content log.

3. The method of claim 1 further comprising:
providing a feed that includes identifying information about currently airing audio content in addition to identifying information about upcoming audio content.

4. The method of claim 1, wherein the distributed radio network provides a feed that includes identifying information about a plurality of portions of audio content that actually aired.

5. The method of claim 4 further comprising:
determining whether or not the local audio content actually aired based on the identifying information included in the feed.

6. The method of claim 1, wherein at least one of the partner systems, through the distributed radio network, automatically replaces at least one previously assigned partner audio content time slots up to a predetermined amount of time prior to air time, wherein the distributed radio network will not replace the previously assigned partner audio content time slot within the predetermined amount of time prior to radio air time.

7. The method of claim 6, wherein the distributed radio network will not replace the previously assigned partner audio content after a final version of the preliminary audio content log is provided.

8. The method of claim 1 further comprising:
the local market audio content delivery system including at least a local market integrated service layer (ISL) that communicates with the centralized hub and the partner system web interface.

9. The method of claim 1 further comprising automatically synchronizing audio metadata associated with the previously assigned partner audio content time slots between a financial component and an audio delivery component, the synchronizing including at least transferring the metadata simultaneously into both a billing system and the audio delivery component.

10. The method of claim 9 further comprising automatically shuffling data to allow movement of the previously assigned partner audio content time slots and synchronizing of at least one radio station audio content portion with at least one of the local audio content logs.

11. The method of claim 1, wherein the distributed radio network stores in computer storage available radio audio content for a network of radio stations.

12. An audio delivery system for a distributed radio network, the system comprising:
a plurality of radio network service gateways, the plurality of radio network service gateways comprising one or more servers of: audio content partner systems; a centralized hub that communicates with the audio content partner systems; and a local radio market integrated service layer (ISL) that communicates with the centralized hub and the audio content partner systems, the centralized hub including an aggregation layer for communications between the local radio market integrated service layer (ISL) and the audio content partner systems;

a distributed radio network, wherein the plurality of network service gateways is associated with the distributed radio network, and wherein an audio content placement transaction for at least one of the audio content partner systems is coordinated with the distributed radio network through the plurality of network service gateways in response to an authorized one of the audio content partner systems requesting access to the plurality of network service gateways; and wherein the coordination of the audio content placement transaction includes: at least one audio content partner system claiming at least one audio content time slot from a group of previously assigned audio content time slots included in a preliminary audio content log communicated to the plurality of network service gateways, wherein the preliminary audio content log comprises a copy of a local audio content log representing at least a portion of a local radio station's audio air schedule; and wherein the at least one audio content partner system further includes transforming both the preliminary audio content log and the local audio content log by automatically releasing any unclaimed previously assigned audio content time slots from the group of previously assigned audio content time slots to a local radio market for insertion of local radio audio content via the distributed radio network, if the unclaimed previously assigned audio content time slots are unclaimed just prior to local radio air time.

13. The system of claim 12, wherein the distributed radio network verifies in a near real time fashion and without manual intervention which audio content actually aired.

14. The system of claim 12 further comprising:
the distributed radio network configured to provide a feed that includes identifying information about a currently airing audio content in addition to identifying information about upcoming audio content.

15. The system of claim 12, wherein the distributed radio network provides a feed that includes identifying information about a plurality of audio contents that actually aired.

16. The system of claim 12, wherein the transaction replaces at least one audio content associated with a previously assigned audio content time slots up to a predetermined amount of time prior to the local radio air time, wherein the distributed radio network will not replace the previously assigned audio content time slots during the predetermined amount of time prior to air time.

17. An audio content delivery system for a distributed radio network, the system comprising:
a plurality of radio network service gateways associated with the distributed radio network, the radio network service gateways comprising a plurality of coupled servers including: local market audio content delivery system servers, a centralized hub server injecting at least a portion of the audio content into the local market audio content delivery system servers and partner system servers to send one or more portions of the audio content to the centralized hub through a partner system web interface, the centralized hub including an aggregation layer for communication of the one or more portions of audio content and audio content schedules, including audio content logs, between coupled ones of the local market audio content delivery system servers and the partner system servers;

one or more of the partner system servers coordinating audio content placement transactions within the distributed radio network through communications between the plurality of network service gateways in response to a partner request through the partner system web interface to the plurality of radio network service gateways;

wherein the audio content placement transactions include providing access to the partner systems servers for claiming at least one audio content time slot from a group of previously assigned partner audio content time slots included in a preliminary audio content log, the preliminary audio content log reflecting a copy of a local audio content log that represents a local radio station's audio play schedule; and wherein at least one of the partner system servers includes a request for audio content time slot placement transactions within the distributed radio network including transforming both the preliminary audio content log and the local audio content log by automatically releasing one or more of the previously assigned partner audio content time slots to a local market audio content delivery system to replace the previously assigned partner audio content time slots with local audio content time slots via the distributed radio network if the previously assigned partner audio content time slots are unclaimed by the one or more partner systems servers just prior to audio content air time; and a ticker feed that includes identifying information about currently playing audio content, identifying information about upcoming audio content and audio content that actually aired.

18. The system of claim 17, wherein the audio content placement transactions replace at least one audio content associated with a previously assigned audio content time slots up to a predetermined amount of time prior to the local radio air time, wherein the distributed radio network will not replace the previously assigned audio content time slots during the predetermined amount of time prior to air time.

19. The system of claim 17 further comprising automatically shuffling data to allow movement of the previously assigned partner audio content time slots and synchronize at least one radio station audio content portion with at least one of the local audio content logs.

20. The system of claim 17, wherein the distributed radio network stores in computer storage available radio content for a network of radio stations.

\* \* \* \* \*